(12) United States Patent
Yoshimura et al.

(10) Patent No.: US 10,596,630 B2
(45) Date of Patent: Mar. 24, 2020

(54) THREE-DIMENSIONAL DEPOSITION DEVICE AND THREE-DIMENSIONAL DEPOSITION METHOD

(71) Applicant: MITSUBISHI HEAVY INDUSTRIES, LTD., Tokyo (JP)

(72) Inventors: Hitoshi Yoshimura, Tokyo (JP); Yoshiharu Ozawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 697 days.

(21) Appl. No.: 15/300,186

(22) PCT Filed: Mar. 19, 2015

(86) PCT No.: PCT/JP2015/058292
§ 371 (c)(1),
(2) Date: Sep. 28, 2016

(87) PCT Pub. No.: WO2015/151839
PCT Pub. Date: Oct. 8, 2015

(65) Prior Publication Data
US 2017/0136545 A1    May 18, 2017

(30) Foreign Application Priority Data
Mar. 31, 2014 (JP) .................. 2014-074056

(51) Int. Cl.
*B22F 3/24* (2006.01)
*B33Y 30/00* (2015.01)
(Continued)

(52) U.S. Cl.
CPC .............. *B22F 3/24* (2013.01); *B22F 3/1055* (2013.01); *B23K 26/342* (2015.10);
(Continued)

(58) Field of Classification Search
CPC ..... B29C 64/20; B29C 64/386; B29C 64/153; B22F 3/1055; B22F 3/24; B22F 2999/00;
(Continued)

(56) References Cited

U.S. PATENT DOCUMENTS 7,020,539 B1 *  3/2006  Kovacevic ............ B22F 3/1055
                                                    700/166
8,784,721 B2    7/2014  Philippi et al.
(Continued)

FOREIGN PATENT DOCUMENTS

CN         101678613 A       3/2010
CN         203109234    *    3/2013  .............. B22F 3/105
(Continued)

OTHER PUBLICATIONS

Machine Translation of CN 203109234 to "China." (B22F 3/105; Mar. 2013). (Year: 2013).*
(Continued)

*Primary Examiner* — Daniel C. McCracken
(74) *Attorney, Agent, or Firm* — Birch, Stewart, Kolasch & Birch, LLP

(57) ABSTRACT

Provided is a three-dimensional deposition device which forms a three-dimensional object by depositing a formed layer on a base unit, comprising: a powder supply unit which supplies a powder material; a light irradiation unit which irradiates the powder material with a light beam and forms a formed layer by sintering or melting and solidifying at least a part of the powder material irradiated with the light beam; a machining unit which includes a tool and performs a machining operation on the formed layer by the tool; and a controller which serves as a control device controlling an operation of at least one of the powder supply unit, the light irradiation unit, and the machining unit.

11 Claims, 13 Drawing Sheets

(51) Int. Cl.
*B22F 3/105* (2006.01)
*B23K 26/342* (2014.01)
*B29C 64/20* (2017.01)
*B29C 64/153* (2017.01)
*B29C 64/386* (2017.01)
*B33Y 10/00* (2015.01)
*B33Y 40/00* (2020.01)
*B33Y 50/02* (2015.01)

(52) U.S. Cl.
CPC ............ *B29C 64/153* (2017.08); *B29C 64/20* (2017.08); *B29C 64/386* (2017.08); *B33Y 10/00* (2014.12); *B33Y 30/00* (2014.12); *B33Y 40/00* (2014.12); *B33Y 50/02* (2014.12); *B22F 2003/1056* (2013.01); *B22F 2003/1057* (2013.01); *B22F 2003/247* (2013.01); *B22F 2999/00* (2013.01); *Y02P 10/295* (2015.11)

(58) Field of Classification Search
CPC ...... B22F 2003/1056; B22F 2003/1057; B22F 2003/247; B22F 3/162; B23K 26/342; B33Y 50/02; B33Y 40/00; B33Y 10/00; B33Y 30/00; Y02P 10/295
See application file for complete search history.

(56) References Cited

U.S. PATENT DOCUMENTS

| | | | |
|---|---|---|---|
| 2004/0026807 | A1 | 2/2004 | Andersson et al. |
| 2007/0193981 | A1 | 8/2007 | Peng et al. |
| 2010/0031882 | A1 | 2/2010 | Abe et al. |

FOREIGN PATENT DOCUMENTS

| | | |
|---|---|---|
| DE | 10 2009 056 686 A1 | 6/2011 |
| EP | 1 396 556 A1 | 3/2004 |
| EP | 2 502 729 A1 | 9/2012 |
| JP | 11-333584 A | 12/1999 |
| JP | 2001-79641 A | 3/2001 |
| JP | 2003-531034 A | 10/2003 |
| JP | 2004-82556 A | 3/2004 |
| JP | 2004-122490 A | 4/2004 |
| JP | 2004-124200 A | 4/2004 |
| JP | 2006-124732 A | 5/2006 |
| JP | 2007-222869 A | 9/2007 |
| JP | 2007-301980 A | 11/2007 |
| JP | 2010-37599 A | 2/2010 |
| WO | WO 2011/067359 A1 | 6/2011 |

OTHER PUBLICATIONS

International Search Report for PCT/JP2015/058292 dated Jun. 16, 2015.
Written Opinion of the International Searching Authority for PCT/JP2015/058292 (PCT/ISA/237) dated Jun. 16, 2015.
Extended European Search Report dated Jun. 30, 2017 issued in corresponding European Patent Application No. 15773975.6.
Partial Supplemental European Search Report dated Feb. 6, 2017 issued in corresponding European Patent Application No. 15773975.6.
Office Action dated Jun. 30, 2017 issued in the corresponding Taiwan Patent Application No. 104110107 with an English translation.
English translation of the Written Opinion of the International Searching Authority (Form PCT/ISA/237), dated Jun. 16, 2015, for International Application No. PCT/JP2015/058292.

* cited by examiner

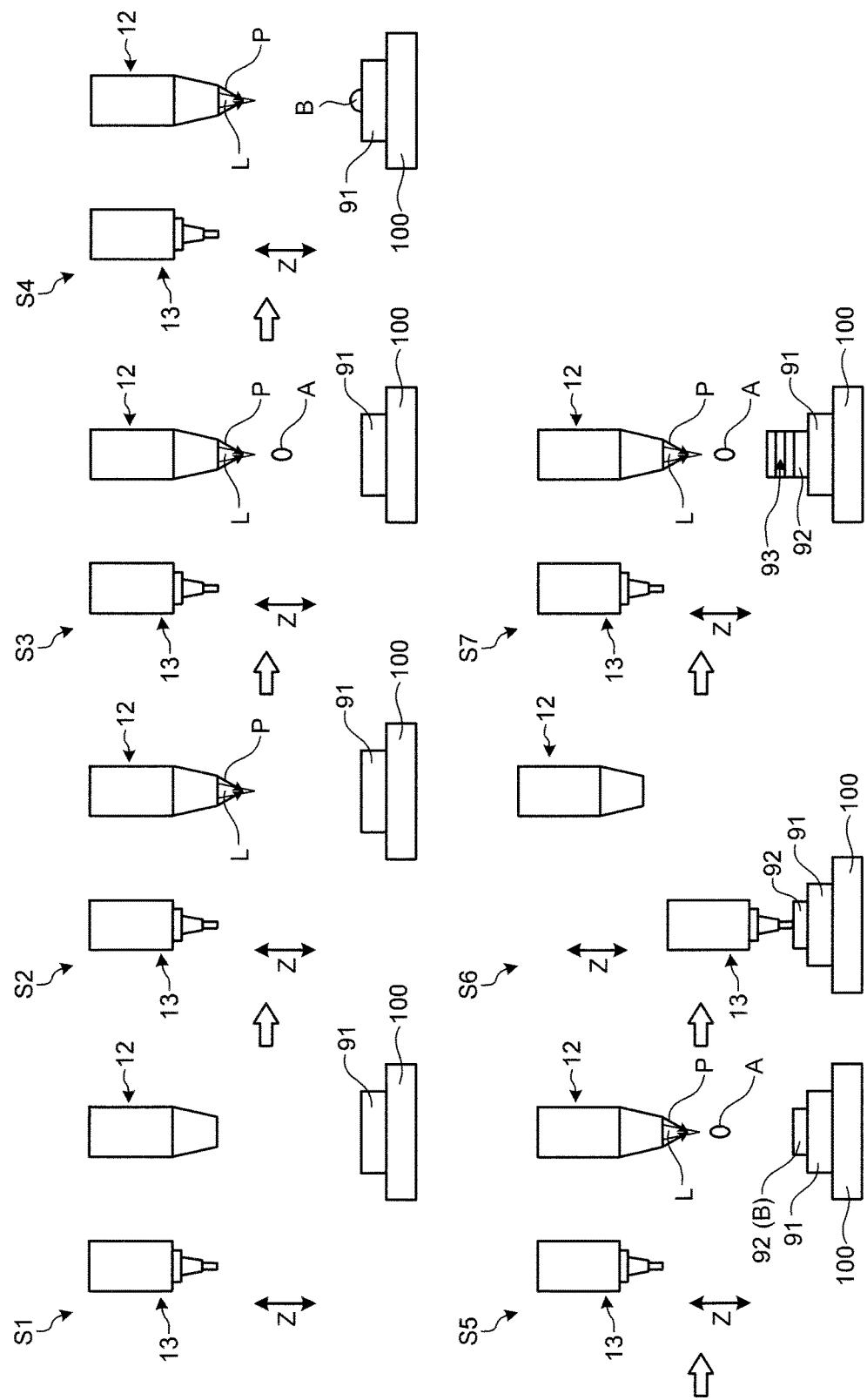

THREE-DIMENSIONAL DEPOSITION DEVICE AND THREE-DIMENSIONAL DEPOSITION METHOD

FIELD

The present invention relates to a three-dimensional deposition device and a three-dimensional deposition method used to manufacture a three-dimensional object by deposition.

BACKGROUND

As a technology of manufacturing a three-dimensional object, there is known a deposition shaping technology of manufacturing a three-dimensional object by irradiating a metallic powder material with a light beam. For example, Patent Literature 1 discloses a method in which a powder layer formed of a metallic powder material is irradiated with a light beam so that a sintered layer is formed and this process is repeated so that a plurality of sintered layers are integrally deposited to form a three-dimensional object.

CITATION LIST

Patent Literature

Patent Literature 1: Japanese Laid-open Patent Publication No. 2004-124200

SUMMARY

Technical Problem

Incidentally, there has been a demand to manufacture the three-dimensional object with high accuracy in the deposition shaping technology of manufacturing the three-dimensional object.

An object of the invention is to provide a three-dimensional deposition device that manufactures a three-dimensional object with high accuracy.

Solution to Problem

To solve the problem and achieve the object above, a three-dimensional deposition device of this invention forms a three-dimensional object by depositing a formed layer on a base unit, includes: a powder supply unit which supplies a powder material; a light irradiation unit which irradiates the powder material with a light beam and sinters or melts and solidifies at least a part of the powder material irradiated with the light beam to form the formed layer; a machining unit which includes a tool and performs a machining operation on the formed layer by the tool; and a controller which controls an operation of at least one of the powder supply unit, the light irradiation unit, and the machining unit.

The three-dimensional deposition device can irradiate the powder material with the light beam to form the formed layer and perform an appropriate machining operation on the formed layer. Thus, the three-dimensional deposition device can manufacture the three-dimensional object with high accuracy.

It is preferable that in the three-dimensional deposition device, the powder supply unit injects the powder material toward the base unit, and the light irradiation unit irradiates the powder material feeding from the powder supply unit toward the base unit with a light beam, melts the powder material, and solidifies the melted powder material on the base unit. The three-dimensional deposition device forms the formed layer by injecting the powder material and irradiating the injected powder material with the light beam. Thus, the three-dimensional deposition device can manufacture the three-dimensional object with high accuracy.

It is preferable that in the three-dimensional deposition device, the powder supply unit includes a nozzle which injects the powder material, and the three-dimensional deposition device comprises a nozzle exchange unit which exchanges the nozzle attached to the powder supply unit by attaching and separating the nozzle of the powder supply unit. Since the three-dimensional deposition device can exchange the nozzle injecting the powder material, it is possible to further appropriately form the formed layer.

It is preferable that the three-dimensional deposition device includes a machining measurement unit which measures a position of a front end of the tool of the machining unit, wherein the controller controls an operation of the machining unit in response to the position of the front end of the tool measured by the machining measurement unit. Since the three-dimensional deposition device controls the operation of the machining unit in response to the measurement result of the position of the front end of the machining unit, it is possible to further appropriately manufacture the three-dimensional object.

It is preferable that the three-dimensional deposition device includes a powder supply measurement unit which measures at least one of a convergence position and a convergence diameter of the injected powder material. Since the three-dimensional deposition device measures the convergence position and the convergence diameter of the injected powder material, it is possible to further appropriately manufacture the three-dimensional object.

It is preferable in the three-dimensional deposition device that the controller controls an operation of at least one of the powder supply unit and the light irradiation unit in response to at least one of the convergence position and the convergence diameter of the powder material measured by the powder supply measurement unit. The three-dimensional deposition device controls an operation of at least one of the powder supply unit and the light irradiation unit based on the measurement result of at least one of the convergence position and the convergence diameter of the injected powder material. Thus, the three-dimensional deposition device can further appropriately manufacture the three-dimensional object.

It is preferable that the three-dimensional deposition device includes a machining measurement unit which measures a position of a front end of the tool of the machining unit; and a powder supply measurement unit which measures at least one of a convergence position and a convergence diameter of the powder material, wherein the machining measurement unit and the powder supply measurement unit correspond to a common device. Since the three-dimensional deposition device has a configuration in which the machining measurement unit and the powder supply measurement unit correspond to a common device, it is possible to suppress an increase in size of the three-dimensional deposition device.

It is preferable that the three-dimensional deposition device includes a tool exchange unit which exchanges the tool attached to the machining unit by attaching and separating the tool of the machining unit. Since the three-dimensional deposition device can exchange the tool of the machining unit, it is possible to further appropriately perform a three-dimensional object cutting operation.

It is preferable in the three-dimensional deposition device that the controller performs a machining operation on a surface of the formed layer by the machining unit after the formed layer is formed by the light irradiation unit and further forms a formed layer on the surface of the formed layer subjected to the machining operation by the light irradiation unit. Since the three-dimensional deposition device can further deposit a formed layer after the machining operation, it is possible to further appropriately form the formed layer.

It is preferable that the three-dimensional deposition device includes a shape measurement unit which measures a surface shape of the formed layer, wherein the controller controls an operation of at least one of the powder supply unit, the light irradiation unit and the machining unit in response to a measurement result of the surface shape of the formed layer obtained by the shape measurement unit. Since the three-dimensional deposition device can control the three-dimensional object manufacturing process in response to the measurement result of the surface shape of the formed layer, it is possible to further appropriately manufacture the three-dimensional object.

It is preferable that the three-dimensional deposition device includes a powder introduction unit which includes a storage unit storing the powder material supplied to the powder supply unit and an identification unit identifying the powder material stored in the storage unit and introduces the powder material of the storage unit identified by the identification unit into the powder supply unit, wherein the controller controls an introduction of the powder material from the powder introduction unit to the powder supply unit in response to the powder material identification result in the identification unit. Since the three-dimensional deposition device controls the introduction of the powder material to the powder supply unit in response to the powder material identification result, it is possible to suppress the three-dimensional object from being manufactured by, for example, an inappropriate powder material and to suppress deterioration in quality of the three-dimensional object.

It is preferable in the three-dimensional deposition device that the controller controls an operation of at least one of the powder supply unit and the light irradiation unit in response to the powder material identification result of the powder introduction unit. Since the three-dimensional deposition device can control the three-dimensional object manufacturing process in response to the powder material identification result, it is possible to further appropriately manufacture the three-dimensional object.

It is preferable that the three-dimensional deposition device includes a three-dimensional deposition chamber which includes therein the powder supply unit, the light irradiation unit, and the machining unit; and a base movement unit which moves the base unit from the outside of the three-dimensional deposition chamber into the three-dimensional deposition chamber. Since the three-dimensional deposition device includes the base movement unit, it is possible to move the base unit into the three-dimensional deposition chamber even when, for example, an operator does not enter the three-dimensional deposition chamber.

To solve the problem and achieve the object above, a three-dimensional deposition method of this invention forms a three-dimensional object by depositing a formed layer formed on a base unit by sintering or melting and solidifying a powder material, includes: a deposition step of melting the powder material by irradiating the powder material with a light beam while injecting the powder material toward the base unit, solidifying the melted powder material on the base unit to form a formed layer on the base unit, and depositing the formed layer; and a machining step of performing a machining operation on a surface of the formed layer. According to the three-dimensional deposition method, the powder material is irradiated with the light beam to form the formed layer and an appropriate machining operation is performed on the formed layer. Thus, according to the three-dimensional deposition method, it is possible to manufacture the three-dimensional object with high accuracy.

It is preferable in the three-dimensional deposition method that in the machining step, a position of a front end of a tool of a machining unit performing the machining operation is measured and a processing condition of the machining operation for the formed layer is determined based on a measurement result of the position of the front end of the tool. According to the three-dimensional deposition method, since a processing condition of the machining operation for the formed layer is determined in response to the measurement result of the position of the front end of the machining unit, it is possible to further appropriately manufacture the three-dimensional object.

It is preferable in the three-dimensional deposition method that in the machining step, a surface shape of the formed layer is measured and a processing condition of the machining operation for the formed layer is determined based on a measurement result of the surface shape of the formed layer. Since the three-dimensional deposition method can determine the processing condition of the machining operation in response to the measurement result of the surface shape of the formed layer, it is possible to further appropriately manufacture the three-dimensional object.

It is preferable in the three-dimensional deposition method that in the machining step, a position of a machining unit performing the machining operation and a surface shape of the formed layer are measured and a processing condition of the machining operation for the formed layer is determined based on a measurement result of the surface shape of the formed layer and the position of the machining unit. According to the three-dimensional deposition method, since the formed layer cutting condition is determined based on the measurement result of the surface shape of the formed layer and the position of the machining unit, it is possible to further appropriately form the formed layer.

It is preferable in the three-dimensional deposition method that in the deposition step, the powder material injected toward the base unit is identified and a powder material introduction condition to the powder supply unit injecting the powder material is determined in response to a powder material identification result. According to the three-dimensional deposition method, since the powder material introduction condition to the powder supply unit is determined in response to the powder material identification result, it is possible to suppress the three-dimensional object from being manufactured by, for example, an inappropriate powder material and to suppress deterioration in quality of the three-dimensional object.

It is preferable in the three-dimensional deposition method that in the deposition step, at least one of a powder material injection condition and a light beam irradiation condition is determined in response to the powder material identification result. According to the three-dimensional deposition method, since it is possible to control the three-dimensional object manufacturing condition in response to the powder material identification result, it is possible to further appropriately manufacture the three-dimensional object.

Advantageous Effects of Invention

According to the invention, it is possible to manufacture the three-dimensional object with high accuracy.

BRIEF DESCRIPTION OF DRAWINGS

FIG. 9 is an explanatory diagram illustrating a method of manufacturing a three-dimensional object by a three-dimensional deposition device according to the embodiment.

DESCRIPTION OF EMBODIMENTS

Hereinafter, preferred embodiments of the invention will be described in detail with reference to the accompanying drawings. Further, the invention is not limited to the embodiment. Then, when there are a plurality of embodiments, a combination of the embodiments may be employed.

Figure 1:
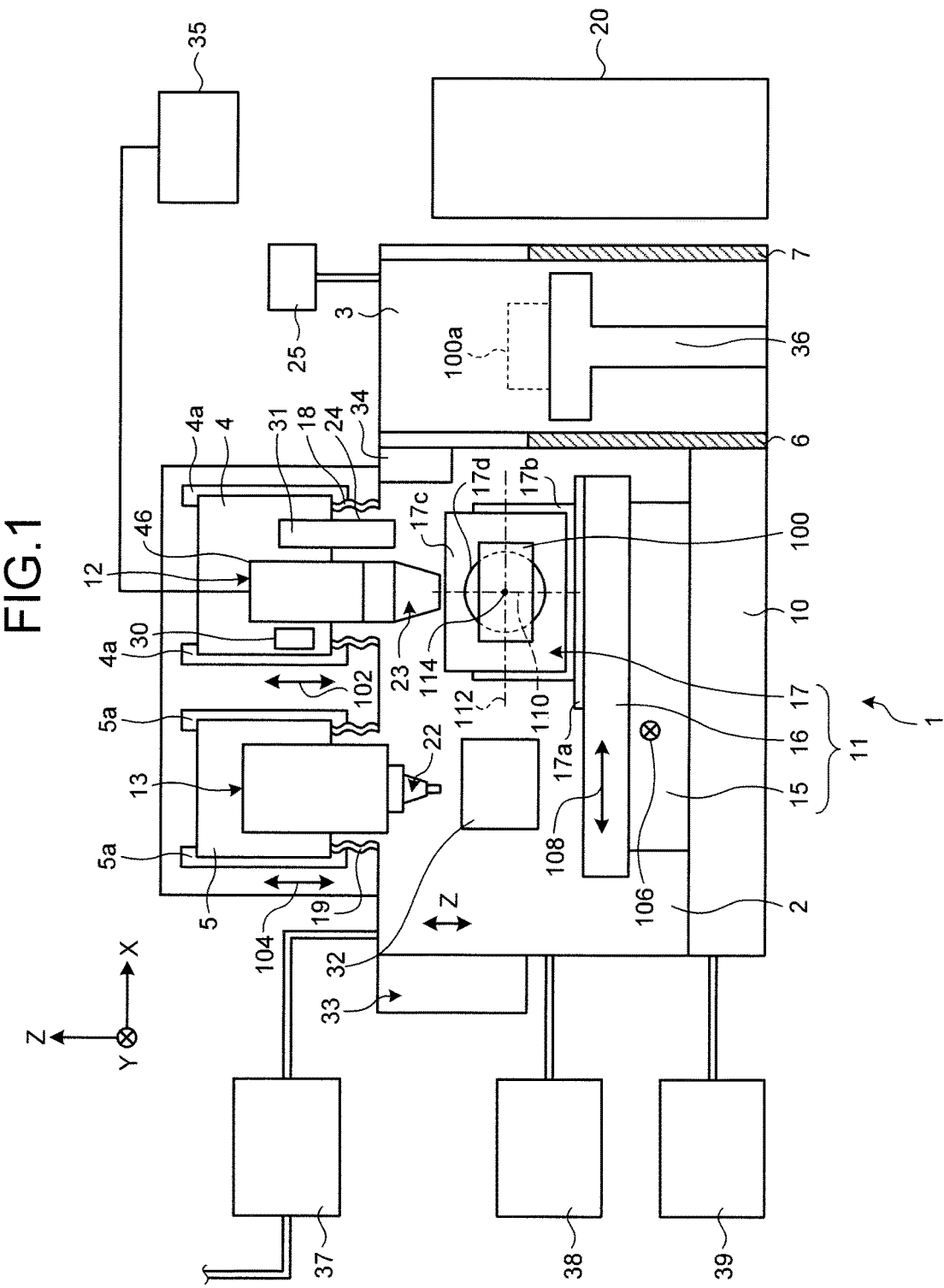
FIG. 1 is a schematic diagram illustrating a three-dimensional deposition device according to an embodiment.

FIG. 1 is a schematic diagram illustrating a three-dimensional deposition device 1 of the embodiment. Here, in the embodiment, one direction within a horizontal plane will be set as an X-axis direction, a direction orthogonal to the X-axis direction within the horizontal plane will be set as a Y-axis direction, and a direction (a vertical direction) orthogonal to each of the X-axis direction and the Y-axis direction will be set as a Z-axis direction.

The three-dimensional deposition device 1 illustrated in FIG. 1 is a device that manufactures a three-dimensional object on a base unit 100. The base unit 100 is a base member on which the three-dimensional object is formed. The base unit 100 is carried to a predetermined position of the three-dimensional deposition device 1 so that the three-dimensional object is formed on a surface thereof. The base unit 100 of the embodiment is a plate-shaped member. Further, the base unit 100 is not limited thereto. As the base unit 100, a base member of the three-dimensional object may be used or a member adding the three-dimensional object may be used. A member corresponding to a component or a product, by forming the three-dimensional object at a predetermined position, may be used as the base unit 100.

The three-dimensional deposition device 1 includes a three-dimensional deposition chamber 2, a spare chamber 3, a deposition head accommodation chamber 4, a machining unit accommodation chamber 5, a bed 10, a table unit 11, a deposition head 12, a machining unit 13, a control device 20, a shape measurement unit 30, a heating head 31, the machine measurement unit 32, a tool exchange unit 33, a nozzle exchange unit 34, a powder introduction unit 35, a base movement unit 36, an air discharge unit 37, a gas introduction unit 38, and a powder collection unit 39.

The three-dimensional deposition chamber 2 is a casing (a chamber) in which a part other than a designed communication part such as a connection pipe is sealed from the outside. The designed communication part is provided with a valve that switches a sealed state and an opened state. If necessary, the three-dimensional deposition chamber 2 can be sealed. The three-dimensional deposition chamber 2 includes therein the bed 10, the table unit 11, the deposition head 12, a part of the machining unit 13, a part of the heating head 31, the machine measurement unit 32, the tool exchange unit 33, and the nozzle exchange unit 34.

The spare chamber 3 is provided adjacent to the three-dimensional deposition chamber 2. In the spare chamber 3, a part other than a designed communication part such as a connection pipe is sealed from the outside. The spare chamber 3 is formed as a decompression chamber that connects the outside and the three-dimensional deposition chamber 2 to each other. The base movement unit 36 is provided inside the spare chamber 3. Here, for example, an airtight door 6 is provided at the connection part with the three-dimensional deposition chamber 2 in the spare chamber 3. Further, the spare chamber 3 is connected to the outside by the airtight door 7. Further, the spare chamber 3 is provided with a air discharge unit 25 which discharges air from the spare chamber 3. When the door 7 is opened, a necessary member can be carried into the spare chamber 3 from the outside. Further, when the door 6 is opened, a member can be carried between the spare chamber 3 and the three-dimensional deposition chamber 2.

The deposition head accommodation chamber 4 is provided at an upper face of the three-dimensional deposition chamber 2 in the Z-axis direction. The deposition head accommodation chamber 4 is supported by a Z-axis slide unit 4a to be movable in the Z-axis direction (a direction of an arrow 102) with respect to the three-dimensional deposition chamber 2. A lower face of the deposition head accommodation chamber 4 in the Z-axis direction is connected to the three-dimensional deposition chamber 2 by a bellows 18. The bellows 18 connects the lower face of the deposition head accommodation chamber 4 in the Z-axis direction to the three-dimensional deposition chamber 2 so that the lower face of the deposition head accommodation chamber 4 in the Z-axis direction is formed as a part of the three-dimensional deposition chamber 2. Further, the three-dimensional deposition chamber 2 is formed so that an opening is formed in an area surrounded by the bellows 18. A space surrounded by the bellows 18 and the lower face of the deposition head accommodation chamber 4 in the Z-axis direction is connected to the three-dimensional deposition chamber 2 and is sealed along with the three-dimensional deposition chamber 2. The deposition head accommodation chamber 4 supports the deposition head 12, the shape measurement unit 30, and the heating head 31. Further, the deposition head accommodation chamber 4 is formed so that a part including a nozzle 23 of the deposition head 12 and a part including a front end 24 of the heating head 31 protrude toward the three-dimensional deposition chamber 2 from the lower face in the Z-axis direction.

When the deposition head accommodation chamber 4 moves in the Z-axis direction by the Z-axis slide unit 4a, the deposition head 12, the shape measurement unit 30, and the heating head 31 held therein are moved in the Z-axis direction. Further, the deposition head accommodation chamber 4 is connected to the three-dimensional deposition chamber 2 through the bellows 18. The bellows 18 is deformed in accordance with the movement in the Z-axis direction and thus a sealed state between the three-dimensional deposition chamber 2 and the deposition head accommodation chamber 4 can be kept.

The machining unit accommodation chamber 5 is provided at the upper face of the three-dimensional deposition chamber 2 in the Z-axis direction. Further, the machining unit accommodation chamber 5 is disposed adjacent to the deposition head accommodation chamber 4. The machining unit accommodation chamber 5 is supported by a Z-axis slide unit 5a to be movable in the Z-axis direction (a direction of an arrow 104) with respect to the three-dimensional deposition chamber 2. A lower face of the machining unit accommodation chamber 5 in the Z-axis direction is connected to the three-dimensional deposition chamber 2 by a bellows 19. The bellows 19 connects the lower face of the machining unit accommodation chamber 5 in the Z-axis direction to the three-dimensional deposition chamber 2 so that the lower face of the machining unit accommodation chamber 5 in the Z-axis direction is formed as a part of the three-dimensional deposition chamber 2. Further, the three-dimensional deposition chamber 2 is formed so that an opening is formed in an area surrounded by the bellows 19. A space surrounded by the lower face of the machining unit accommodation chamber 5 in the Z-axis direction and the bellows 19 is connected to the three-dimensional deposition chamber 2 and is sealed along with the three-dimensional deposition chamber 2. The machining unit accommodation chamber 5 supports the machining unit 13. Further, the machining unit accommodation chamber 5 is formed so that a part including a tool 22 of the machining unit 13 protrudes toward the three-dimensional deposition chamber 2 from the lower face in the Z-axis direction.

When the machining unit accommodation chamber 5 moves in the Z-axis direction by the Z-axis slide unit 5a, the machining unit 13 held therein is moved in the Z-axis direction. Further, the machining unit accommodation chamber 5 is connected to the three-dimensional deposition chamber 2 through the bellows 19. The bellows 19 is deformed in accordance with the movement in the Z-axis direction and thus a sealed state between the three-dimensional deposition chamber 2 and the machining unit accommodation chamber 5 can be kept.

The bed 10 is provided at a bottom in the three-dimensional deposition chamber 2 in the Z-axis direction.

The bed 10 supports the table unit 11. Various wirings, pipes, or driving assemblies are disposed on the bed 10.

The table unit 11 is disposed on an upper face of the bed 10 and supports the base unit 100. The table unit 11 includes a Y-axis slide unit 15, an X-axis slide unit 16, and a rotation table unit 17. The table unit 11 has the base unit 100 attached thereto and moves the base unit 100 on the bed 10.

The Y-axis slide unit 15 moves the X-axis slide unit 16 in the Y-axis direction (a direction of an arrow 106) with respect to the bed 10. The X-axis slide unit 16 is fixed to a member corresponding to a movable part of the Y-axis slide unit 15. The X-axis slide unit 16 moves the rotation table unit 17 in the X-axis direction (a direction of an arrow 108) with respect to the Y-axis slide unit 15. The rotation table unit 17 is fixed to a member corresponding to a movable part of the X-axis slide unit 16 and supports the base unit 100. The rotation table unit 17 is, for example, an inclined circular table and includes a fixing base 17a, a rotation table 17b, an inclination table 17c, and a rotation table 17d. The fixing base 17a is fixed to a member corresponding to a movable part of the X-axis slide unit 16. The rotation table 17b is supported by the fixing base 17a. The rotation table 17b rotates about a rotation shaft 110 which is a rotation axis and is parallel to the Z-axis direction. The inclination table 17c is supported by the rotation table 17b. The inclination table 17c rotates about a rotation shaft 112 which is an axis and is orthogonal to a face supporting the rotation table 17b. The rotation table 17d is supported by the inclination table 17c. The rotation table 17d rotates about a rotation shaft 114 which is an axis and is orthogonal to a surface supporting the inclination table 17c. The rotation table 17d is used to fix the base unit 100. In this way, the rotation table unit 17 can rotate the base unit 100 about three orthogonal axes by rotating the components thereof about the rotation shafts 110, 112, and 114. The table unit 11 moves the base unit 100 fixed to the rotation table unit 17 in the Y-axis direction and the X-axis direction by the Y-axis slide unit 15 and the X-axis slide unit 16. Further, the table unit 11 rotates the base unit 100 about three orthogonal axes by rotating the components thereof about the rotation shafts 110, 112, and 114 by the rotation table unit 17. The table unit 11 may further move the base unit 100 in the Z-axis direction.

The deposition head 12 injects a powder material toward the base unit 100, irradiates the powder material injected onto the base unit with a laser beam to melt the powder, and solidifies the melted powder on the base unit 100 to form a formed layer. The powder which is introduced into the deposition head 12 is powder which is used as a raw material of the three-dimensional object. In the embodiment, for example, a metal material such as iron, copper, aluminum, or titanium can be used as the powder. As the powder, a material such as ceramic other than the metal material may be used. The deposition head 12 is provided at a position facing the upper face of the bed 10 in the Z-axis direction. The deposition head 12 faces the table unit 11. A lower part of the deposition head 12 in the Z-axis direction is provided with the nozzle 23. The nozzle 23 is attached to a main body 46 of the deposition head 12.

Figure 2:
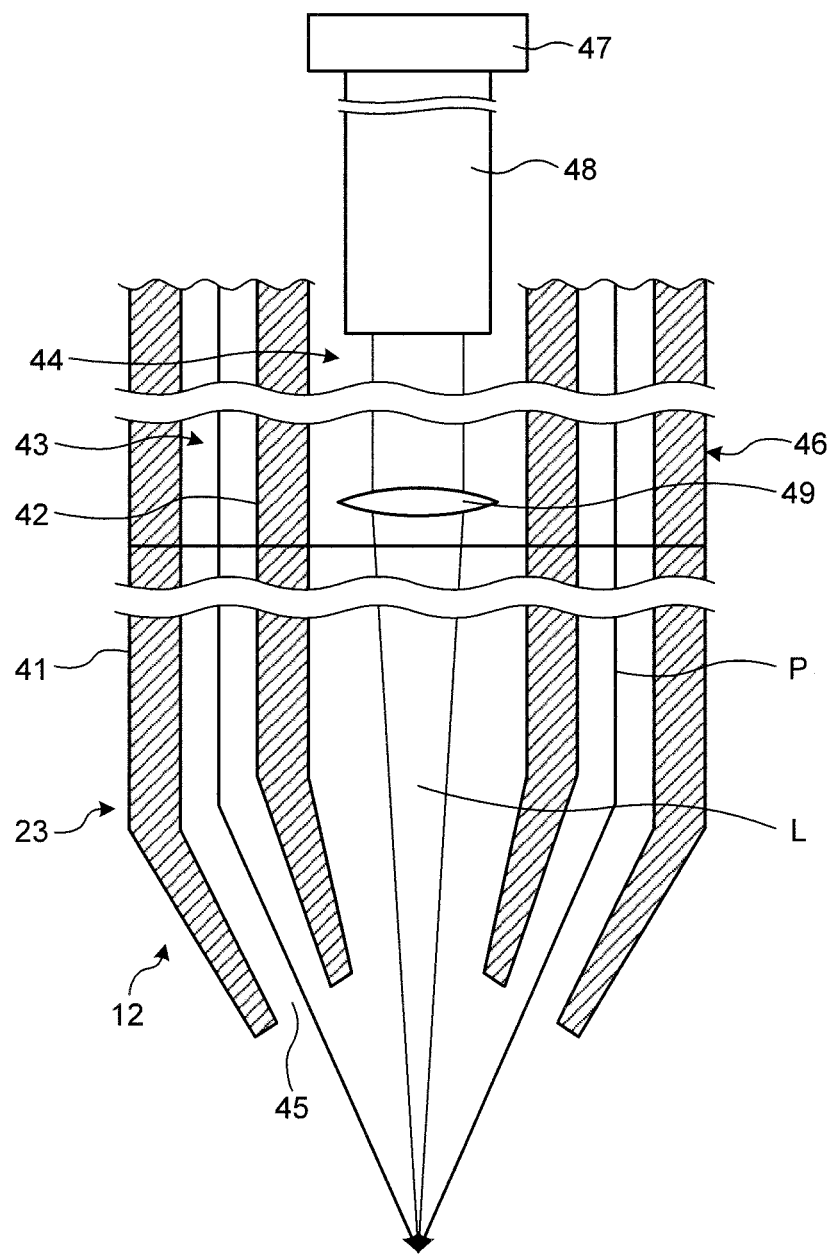
FIG. 2 is a cross-sectional view illustrating an example of a front end of a deposition head.

FIG. 2 is a cross-sectional view illustrating an example of the nozzle 23 of the deposition head 12. As illustrated in FIG. 2, the nozzle 23 is a double tube including an outer tube 41 and an inner tube 42 inserted into the outer tube 41. The outer tube 41 is a tubular member and is formed so that a diameter decreases as it goes toward a front end (the downside in the Z-axis direction). The inner tube 42 is inserted into the outer tube 41. The inner tube 42 is also a tubular member and has a shape in which a diameter decreases as it goes toward a front end (the downside in the Z-axis direction). In the nozzle 23, a gap between an inner periphery of the outer tube 41 and an outer periphery of the inner tube 42 is formed as a powder passage 43 through which a powder material (powder) P passes. An inner peripheral face side of the inner tube 42 is formed as a laser path 44 through which a laser beam passes. Here, the main body 46 to which the nozzle 23 is attached is a double tube similarly to the nozzle 23 and the powder passage 43 and the laser path 44 are formed in this way. In the deposition head 12, the powder passage 43 is disposed to surround the laser path 44. In the embodiment, the powder passage 43 is formed as a powder injection unit which injects powder. In the deposition head 12, the powder P which is introduced from the powder introduction unit 35 flows through the powder passage 43. The powder P is injected from a nozzle injection opening 45 which is an opening at an end side between the outer tube 41 and the inner tube 42.

The deposition head 12 injects the powder P to have a predetermined convergence diameter at a predetermined convergence position. Here, the convergence diameter indicates a diameter of a track of the powder P when the diameter of the track of the injected powder P becomes minimal. As described above, since the nozzle 23 is formed so that the diameter decreases as it goes toward the front end, the deposition head 12 injects the powder P so that the powder is converged at the inside in a radiation direction. That is, the deposition head 12 injects the powder P so that the track of the powder P has a predetermined convergence diameter. Further, the convergence position indicates a position in which the track of the injected powder P is converged.

Further, the deposition head 12 includes a light source 47, an optical fiber 48, and a light concentrating unit 49. The light source 47 outputs a laser beam. The optical fiber 48 guides a laser output from the light source 47 to the laser path 44. The light concentrating unit 49 is disposed at the laser path 44 and is disposed at the optical path of the laser output from the optical fiber 48. The light concentrating unit 49 concentrates a laser beam L output from the optical fiber 48. The laser beam L which is concentrated by the light concentrating unit 49 is output from the end of the inner tube 42. In the deposition head 12, the light concentrating unit 49 is disposed at the main body 46, but a part or the entirety of the light concentrating unit 46 may be disposed at the nozzle 23. When a part or the entirety of the light concentrating unit 46 is disposed at the nozzle 23, a focal position can be changed to a different position by the replacement of the nozzle 23.

The deposition head 12 injects the powder P from the powder passage 43 and outputs the laser beam L from the laser path 44. The powder P injected from the deposition head 12 enters an area irradiated with the laser beam L output from the deposition head 12. The powder P is heated by the laser beam L. The powder P irradiated with the laser beam L is melted and reaches the base unit 100. The powder P which reaches the base unit 100 in a melted state is cooled and solidified. Accordingly, a formed layer is formed on the base unit 100.

Here, the deposition head 12 of the embodiment may not include an optical fiber which guides the laser beam L output from the light source 47 to the optical fiber 48. Further, the light concentrating unit 49 may be provided at one of or both the main body 46 and the nozzle 23. Since the deposition head 12 of the embodiment can be processed effectively, the powder passage 43 ejecting the powder P and the laser path 44 irradiated with the laser beam L are provided coaxially. However, the deposition head 12 is not limited thereto. The deposition head 12 may be formed so that an assembly for injecting the powder P and an assembly for emitting the laser beam L are provided as separate members. The deposition head 12 of the embodiment irradiates a powder material with a laser beam, but may emit a light beam other than the laser beam as long as the powder material can be melted or sintered.

The machining unit 13 is used to machine, for example, a formed layer or the like. As illustrated in FIG. 1, the machining unit 13 is provided at a position facing the upper face of the bed 10 in the Z-axis direction and faces the table unit 11. The tool 22 is attached to a lower part of the machining unit 13 in the Z-axis direction. Additionally, the machining unit 13 may be provided in the movable range of the base unit 100 using the table unit 11 above the bed 10 in the Z-axis direction. Here, the arrangement position is not limited to the position of the embodiment.

Figure 3:
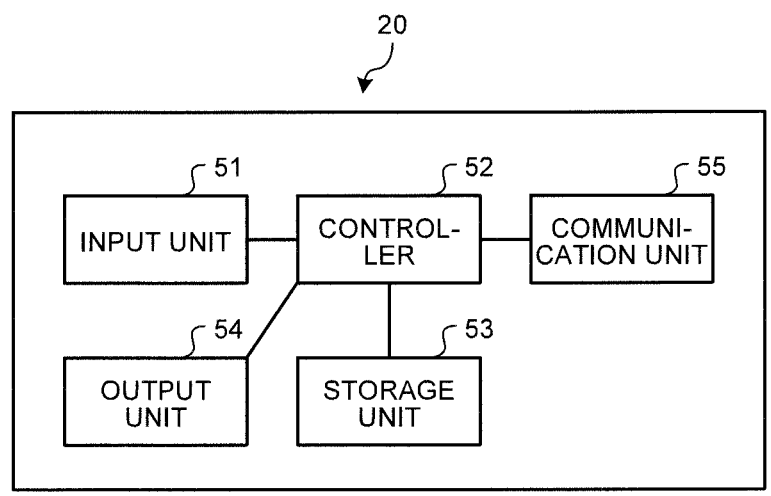
FIG. 3 is a schematic diagram illustrating a configuration of a control device.

FIG. 3 is a schematic diagram illustrating a configuration of the control device 20. The control device 20 is electrically connected to the components of the three-dimensional deposition device 1 and controls the operations of the components of the three-dimensional deposition device 1. The control device 20 is provided at the outside of the three-dimensional deposition chamber 2 or the spare chamber 3. The control device 20 includes, as illustrated in FIG. 3, an input unit 51, a controller 52, a storage unit 53, an output unit 54, and a communication unit 55. The components of the input unit 51, the controller 52, the storage unit 53, the output unit 54, and the communication unit 55 are electrically connected to one another.

The input unit 51 is, for example, an operation panel. An operator inputs information or an instruction to the input unit 51. The controller 52 includes, for example, a CPU (Central Processing Unit) and a memory. The controller 52 outputs an instruction for controlling the operations of the components of the three-dimensional deposition device 1 to the components of the three-dimensional deposition device 1. Further, information is input to the controller 52 from the components of the three-dimensional deposition device 1. The storage unit 53 is, for example, a storage device such as a RAM (Random Access Memory) or a ROM (Read Only Memory). The storage unit 53 stores an operation program for the three-dimensional deposition device 1 controlling the operations of the components by the controller 52 executing the program, information of the three-dimensional deposition device 1, or design information of the three-dimensional object. The output unit 54 is, for example, a display. The output unit 54 displays, for example, information of the components of the three-dimensional deposition device 1. The communication unit 55 exchanges information with, for example, a communication line such as the Internet or a LAN (Local Area Network) by communicating with the communication line. Additionally, the control device 20 may include at least the controller 52 and the storage unit 53. The control device 20 may output an instruction to the components of the three-dimensional deposition device 1 if the controller 52 and the storage unit 53 are provided.

The shape measurement unit 30 is fixed to the deposition head accommodation chamber 4. The shape measurement unit 30 is disposed adjacent to the deposition head 12. The shape measurement unit 30 measures a surface shape of the formed layer formed on the base unit 100. As the shape measurement unit 30, for example, a 3D scanner or a device measuring a relative distance can be used. For example, the shape measurement unit 30 performs scanning the surface of the formed layer on the base unit 100 by a laser beam to calculate position information of the surface of the formed layer from reflected light. The shape measurement unit then measures the surface shape of the formed layer. Further, in the embodiment, the shape measurement unit 30 is attached to the deposition head accommodation chamber 4. However, the shape measurement unit 30 may be attached to a different position as long as the surface shape of the formed layer formed on the base unit 100 can be measured.

The heating head 31 heats the formed layer or the melted powder P on the base unit 100. The heating head 31 is fixed to the deposition head accommodation chamber 4. The heating head 31 is disposed adjacent to the deposition head 12. For example, the heating head 31 irradiates the formed layer or the melted powder P with a laser beam, infrared light, or an electromagnetic wave so that the formed layer or the melted powder is heated. When the formed layer or the melted powder P is heated by the heating head 31, a temperature of the formed layer or the melted powder P can be controlled. Accordingly, it is possible to suppress an abrupt decrease in temperature of the formed layer or the melted powder P or to form an atmosphere (a high-temperature environment) in which the powder P is easily melted. Additionally, the heating head 31 may further include, for example, a temperature sensor that measures a temperature of the surface of the formed layer. The heating head 3 may control the heating based on a measurement result of the temperature sensor.

Figure 4:
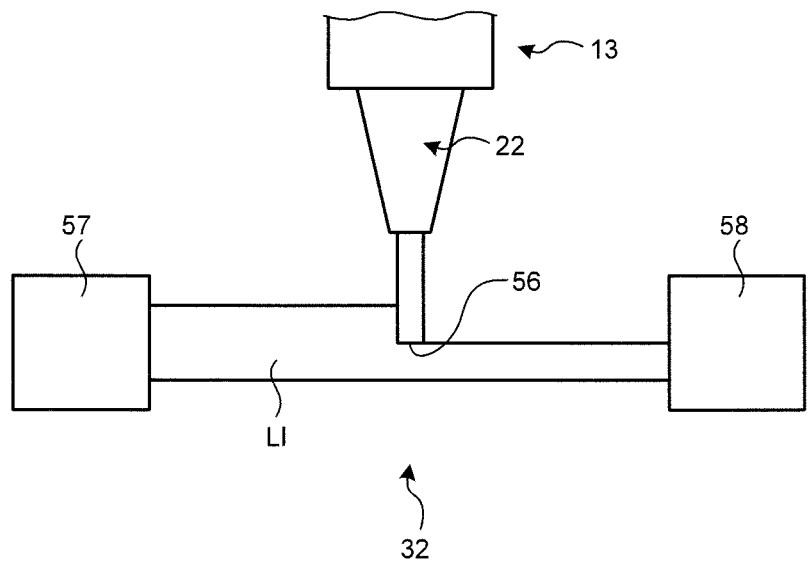
FIG. 4 is a schematic diagram illustrating an example of a machine measurement unit.

The machine measurement unit 32 serves as a machining measurement unit and measures a position of a front end 56 of the tool 22 of the machining unit 13. FIG. 4 is a schematic diagram illustrating an example of the machine measurement unit 32. As illustrated in FIG. 4, the machine measurement unit 32 includes a light source unit 57 and an image capturing unit 58. In the machine measurement unit 32, the front end 56 of the tool 22 of the machining unit 13 is located between the light source unit 57 and the image capturing unit 58. The light source unit 57 is, for example, an LED. The image capturing unit 58 is, for example, a CCD (Charge Coupled Device) camera. The machine measurement unit 32 irradiates the image capturing unit 58 with light from the light source unit 57 while the front end 56 of the tool 22 is disposed between the light source unit 57 and the image capturing unit 58. The machine measurement unit 32 then acquires an image by the image capturing unit 58. Accordingly, it is possible to acquire an image in which light is interrupted by the front end 56 of the tool 22. The machine measurement unit 32 can acquire a shape and a position of the front end 56 by analyzing the image acquired by the image capturing unit 58 and specifically detecting a boundary between a light incident position and a non-light incident position. The control device 20 detects an accurate position of the front end of the tool 22 attached to the machining unit 13 based on the acquired position of the front end 56 of the tool 22 and a position of the machining unit 13 (a position of the machining unit accommodation chamber 5). Additionally, the machine measurement unit 32 is not limited to this configuration as long as measuring the position of the front end 56 of the machining unit 13. For example, the front end may be measured by a laser beam.

The machine measurement unit 32 also serves as a powder supply measurement unit and measures a convergence position and a convergence diameter of the powder P injected from the deposition head 12. The machine measurement unit 32 acquires an image by the image capturing unit 58 by irradiating the image capturing unit 58 with light from the light source unit 57 while the deposition head 12 is located so that the powder P is converged between the light source unit 57 and the image capturing unit 58. For this reason, the machine measurement unit 32 can acquire an image in which light is interrupted by the injected powder P. The machine measurement unit 32 analyzes the image acquired by the image capturing unit 58 and acquires the convergence position and the convergence diameter of the powder P. Specifically, the machine measurement unit 32 determines a position in which brightness is low due to the interruption of light as an area to which the powder P is injected. The machine measurement unit 32 then acquires the convergence position and the convergence diameter of the powder P by measuring a minimal diameter of the area to which the powder P is injected and a position of the minimal diameter from the acquired image. Additionally, the machine measurement unit 32 may acquire any one of the convergence position and the convergence diameter of the powder P.

Figure 5:
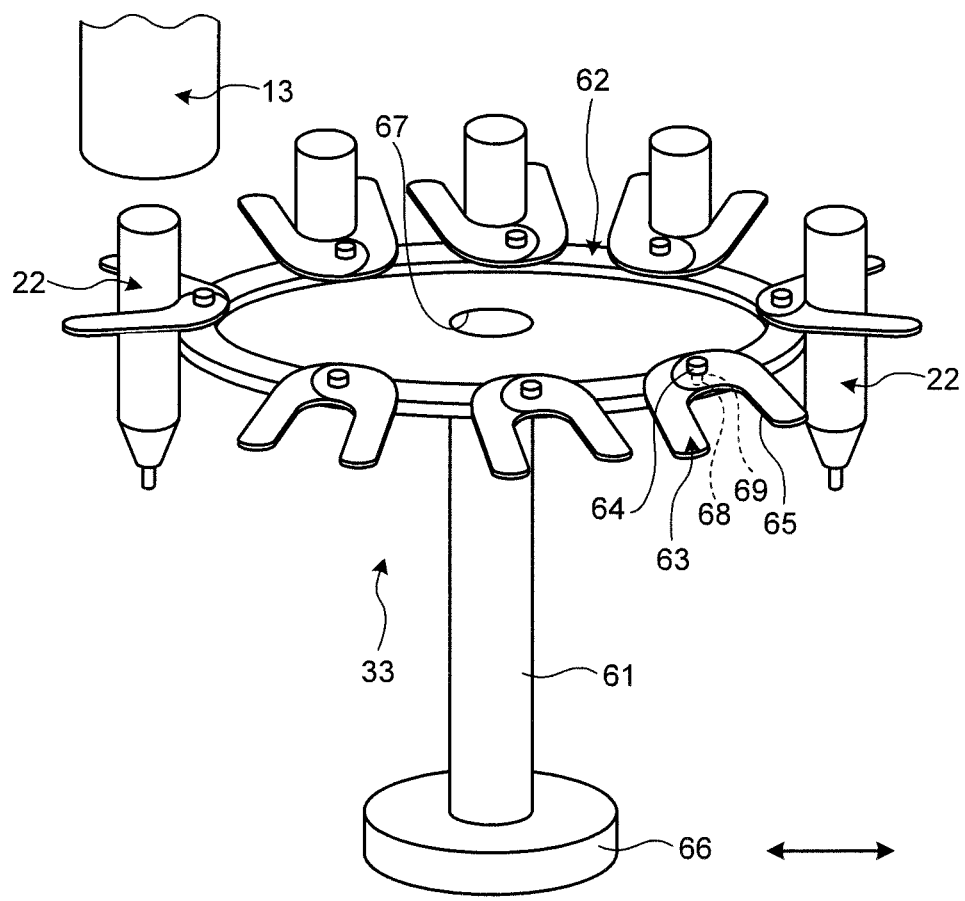
FIG. 5 is a schematic diagram illustrating an example of a tool exchange unit.

The tool exchange unit 33 is disposed inside the three-dimensional deposition chamber 2. The tool exchange unit 33 is used to exchange the tool 22 attached to the machining unit 13. FIG. 5 is a schematic diagram illustrating an example of the tool exchange unit 33. As illustrated in FIG. 5, the tool exchange unit 33 includes a shaft part 61, a disc part 62, a plurality of holding parts 63, and a movement part 66.

The shaft part 61 is a shaft-shaped member and rotates about, for example, an axial direction. The disc part 62 is a disc-shaped member. The disc part 62 includes an opening 67 formed at the center thereof. Further, the disc part 62 is formed so that an outer edge is provided with a plurality of threaded holes 68 formed at a predetermined interval in a circumferential direction. The disc part 62 is formed so that the opening 67 is fixed to the shaft part 61. The disc part 62 rotates in accordance with the rotation of the shaft part 61.

The plurality of holding parts 63 are provided at an outer periphery of the disc part 62 in a circumferential direction of the disc part 62. Each holding part 63 includes a threaded hole 69. The holding part 63 is fixed to the disc part 62 when the threaded hole 69 is overlapped with the threaded hole 68 of the disc part 62 and is fastened by a bolt 64. A method of fixing the holding part 63 is not limited thereto. The holding part 63 includes a gripping part 65. The gripping part 65 protrudes outward in a radiation direction of the disc part 62. The gripping part 65 has, for example, a shape with two protrusions and the tool 22 of the machining unit 13 can be gripped between two protrusions. The tool exchange unit 33 holds different kinds of tools 22 which have different sizes and are used for different processes by the holding parts 63.

The movement part 66 is provided at the shaft part 61. When the movement part 66 moves the shaft part 61 in the X-axis direction and the Y-axis direction, the holding part 63 holding the tool 22 is moved in the X-axis direction and the Y-axis direction. When the movement part 66 moves the shaft part 61, the tool 22 held by the holding part 63 of the disc part 62 is moved from a position facing the machining unit 13 to a position in which a processing operation is not disturbed.

The tool exchange unit 33 moves the disc part 62 to a position where the disc part faces the machining unit 13 by the movement part 66. Subsequently, the tool exchange unit 33 rotates the shaft part 61 so that the gripping part 65 which does not grip the tool 22 is moved to a position facing the machining unit 13. Subsequently, the gripping part 65 is moved by the movement part 66 so that the gripping part 65 is brought into contact with the tool 22 attached to the machining unit 13 and the tool 22 is gripped by the gripping part 65. In this state, a process of separating the machining unit 13 and the tool 22 from each other is performed. Subsequently, the gripping part 65 which grips a different tool 22 attached to the machining unit 13 is moved to a position facing the machining unit 13 and the different tool 22 is attached to the machining unit 13.

In this way, the tool exchange unit 33 can exchange the tool 22 of the machining unit by attaching or separating the tool 22 of the machining unit 13. Additionally, the tool exchange unit 33 is not limited to this configuration as long as it can exchange the tool 22 of the machining unit.

Figure 6:
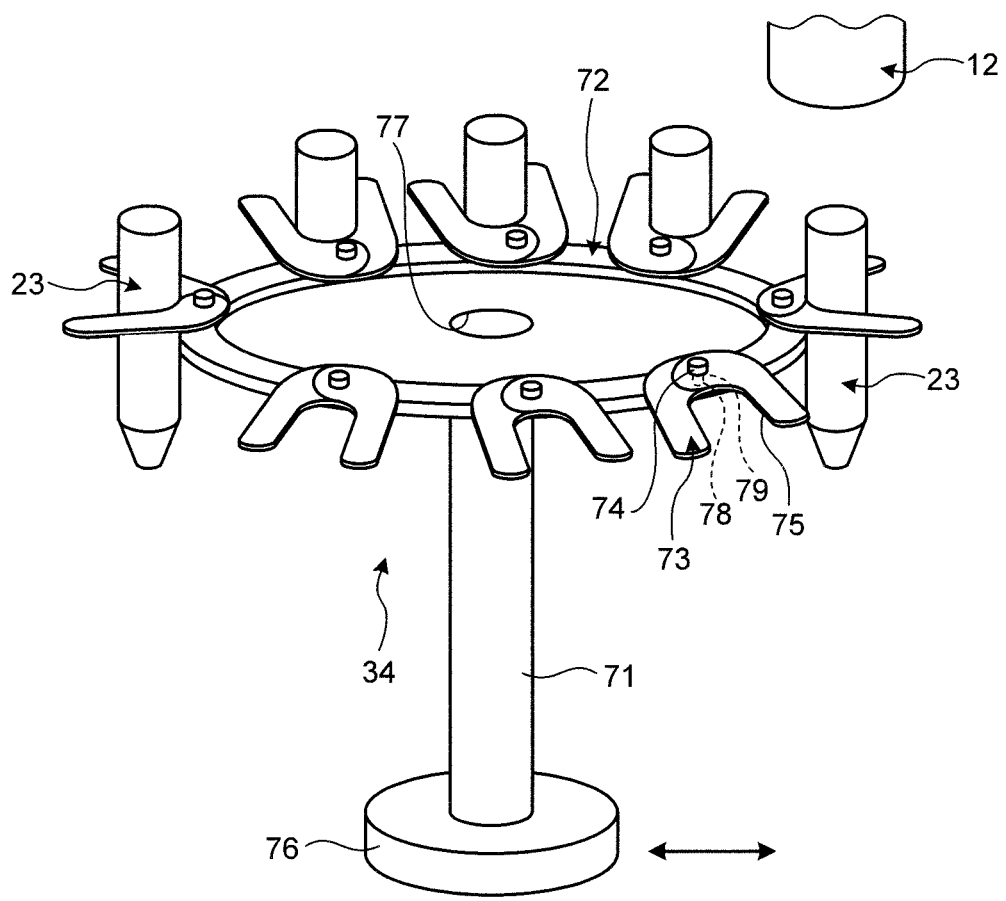
FIG. 6 is a schematic diagram illustrating an example of a nozzle exchange unit.

The nozzle exchange unit 34 is disposed inside the three-dimensional deposition chamber 2. The nozzle exchange unit 34 is used to exchange the nozzle 23 attached to the deposition head 12. FIG. 6 is a schematic diagram illustrating an example of the nozzle exchange unit 34. As illustrated in FIG. 6, the nozzle exchange unit 34 includes a shaft part 71, a disc part 72, a plurality of holding parts 73, and a movement part 76. The nozzle exchange unit 34 has the same configuration as that of the tool exchange unit 33 except that the nozzle 23 of the deposition head 12 is exchanged instead of the tool 22 of the machining unit 13. More specifically, the shaft part 71, the disc part 72, the holding part 73, a bolt 74, a gripping part 75, the movement part 76, a opening 77, a threaded hole 78, and a threaded hole 79 of the nozzle exchange unit 34 respectively correspond to the shaft part 61, the disc part 62, the holding part 63, the bolt 64, the gripping part 65, the movement part 66, the opening 67, the threaded hole 68, and the threaded hole 69 of the tool exchange unit 33. Thus, a description of the nozzle exchange unit 34 will be omitted.

Figure 7A:
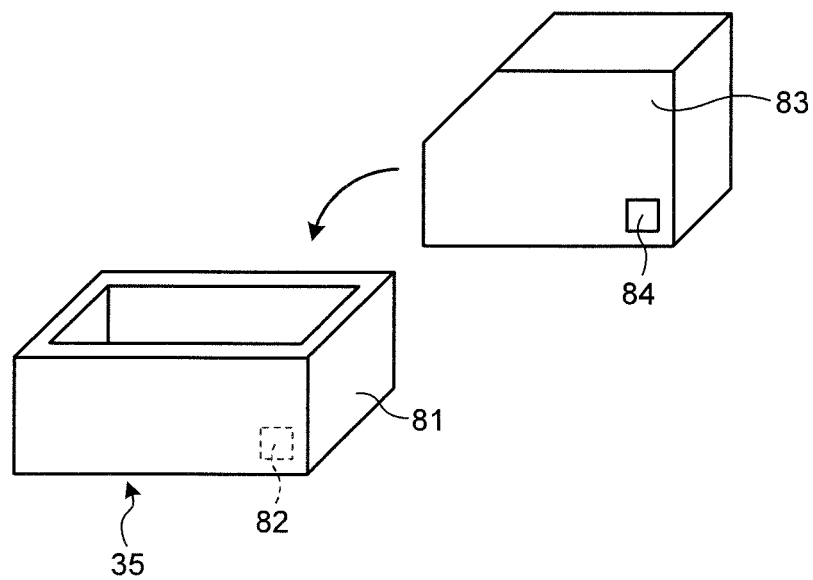
FIG. 7A is a schematic diagram illustrating an example of a powder introduction unit.
Figure 7B:
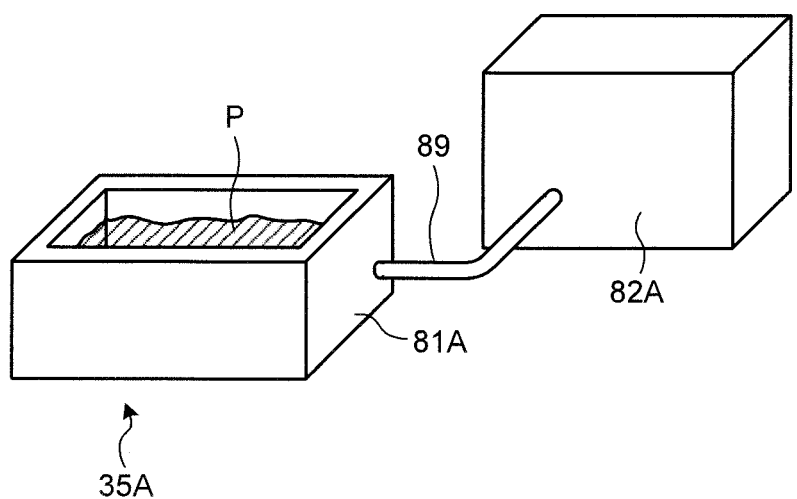
FIG. 7B is a schematic diagram illustrating an example of the powder introduction unit.

The powder introduction unit 35 introduces a powder material which becomes a raw material of a three-dimensional object to the deposition head 12. FIGS. 7A and 7B are schematic diagrams illustrating examples of the powder introduction unit. As illustrated in FIG. 7A, in the embodiment, the powder P is managed while being enclosed in a cartridge 83. That is, the powder is shipped while being enclosed in the cartridge 83 in accordance with, for example, the type of material. The cartridge 83 is provided with a material display part 84. The material display part 84 is, for example, a display which indicates powder information such as a material type. The material display part 84 is not limited to information which can be checked by eyes and may be an IC chip or a two-dimensional code or mark. This information can be acquired by a reader. The material display part 84 is not limited thereto as long as the type of powder can be displayed. The material display part 84 can indicate, for example, powder information necessary for manufacturing the three-dimensional object such as a particle size, a weight, purity of powder or an oxide coating of powder other than the type of powder. Further, the material display part 84 may include information which indicates whether the powder is a regular product.

The powder introduction unit 35 includes a powder storage unit 81 which is a storage unit and a powder identification unit 82 which is an identification unit. The powder storage unit 81 is, for example, a box-shaped member and accommodates the cartridge 83 therein. The powder storage unit 81 is connected to a carrying air supply part which carries out the powder or a carrying path through which the powder is carried to the deposition head 12. The powder storage unit 81 introduces the powder stored in the cartridge 83 into the deposition head 12 when the cartridge 83 is accommodated therein. When the powder identification unit 82 detects a state where the cartridge 83 is accommodated in the powder storage unit 81, the material display part 84 of the cartridge 83 is read so that the information of the powder stored in the cartridge 83 is read. The powder introduction unit 35 can supply known powder to the deposition head 12 by acquiring the powder information by the powder identification unit 82.

Here, the powder introduction unit 35 may supply a powder which is not managed while being enclosed in the cartridge 83 to the deposition head 12. FIG. 7B illustrates a powder introduction unit 35A in which the powder is not enclosed in the cartridge. The powder introduction unit 35A includes a powder storage unit 81A, a powder identification unit 82A, and a powder guide tube 89 which connects the powder storage unit 81A and the powder identification unit 82A to each other. The powder storage unit 81A is, for example, a box-shaped member and stores the powder P therein. The powder identification unit 82A analyzes the powder supplied through the powder guide tube 89 and measures the powder information necessary for manufacturing the three-dimensional object such as a particle size, a weight, purity of powder or an oxide coating of powder. As the powder identification unit 82A, a spectral analysis device which identifies a powder material by a spectral analysis, a particle size analysis device which measures a powder particle size by a particle size analysis, and a weight measurement device which measures a powder weight can be used. The powder identification unit 82A measures powder purity from, for example, the type, the particle size, and the weight of the powder measured as described above. Further, the powder identification unit 82A measures the oxide coating of the powder by, for example, conductivity. The powder introduction unit 35A also can supply known powder to the deposition head 12 by acquiring the powder information by the powder identification unit 82A.

The base movement unit 36 is disposed in the spare chamber 3. The base movement unit 36 moves a base unit 100a from the inside of the spare chamber 3 into the three-dimensional deposition chamber 2 and moves the base unit 100 inside the three-dimensional deposition chamber 2 into the spare chamber 3. The base unit 100a which is carried into the spare chamber 3 from the outside is attached to the base movement unit 36. The base movement unit 36 carries the base unit 100a attached thereto from the spare chamber 3 into the three-dimensional deposition chamber 2. More specifically, the base movement unit 36 moves the base unit 100a attached to the base movement unit 36 into the three-dimensional deposition chamber 2 so that the base unit is attached to the rotation table unit 17. The base movement unit 36 moves the base unit 100 by, for example, a robot arm or an orthogonal carrying device.

The air discharge unit 37 is, for example, a vacuum pump and discharges air inside the three-dimensional deposition chamber 2. The gas introduction unit 38 introduces a gas having a predetermined element, for example, an inert gas such as argon and nitrogen into the three-dimensional deposition chamber 2. The three-dimensional deposition device 1 discharges the air of the three-dimensional deposition chamber 2 by the air discharge unit 37 and introduces a gas into the three-dimensional deposition chamber 2 by the gas introduction unit 38. Accordingly, the three-dimensional deposition device 1 can form a desired gas atmosphere inside the three-dimensional deposition chamber 2. Here, in the embodiment, the gas introduction unit 38 is provided below the air discharge unit 37 in the Z-axis direction. When the three-dimensional deposition device 1 uses argon having a specific weight higher than that of a gas such as oxygen in air as an introduction gas while the gas introduction unit 38 is provided below the air discharge unit 37 in the Z-axis direction, an argon gas can be appropriately charged into the three-dimensional deposition chamber 2. Additionally, when the introduction gas is set as a gas lighter than air, a pipe may be disposed in an opposite way.

The powder collection unit 39 collects the powder P which is injected from the nozzle injection opening 45 of the deposition head 12 and is not used to form a formed layer. The powder collection unit 39 suctions the gas inside the three-dimensional deposition chamber 2 and collects the powder P included in the gas. The powder P which is injected from the deposition head 12 is melted and solidified by the laser beam L so that a formed layer is formed. However, since a part of the powder P is not irradiated with, for example, the laser beam L, there is a case where the powder is left inside the three-dimensional deposition chamber 2. Further, chips which are cut by the machining unit 13 and are discharged from the formed layer are left in the three-dimensional deposition chamber 2. The powder collection unit 39 collects the powder P or chips left in the three-dimensional deposition chamber 2. The powder collection unit 39 may include an assembly such as a brush which mechanically collects the powder.

Figure 8:
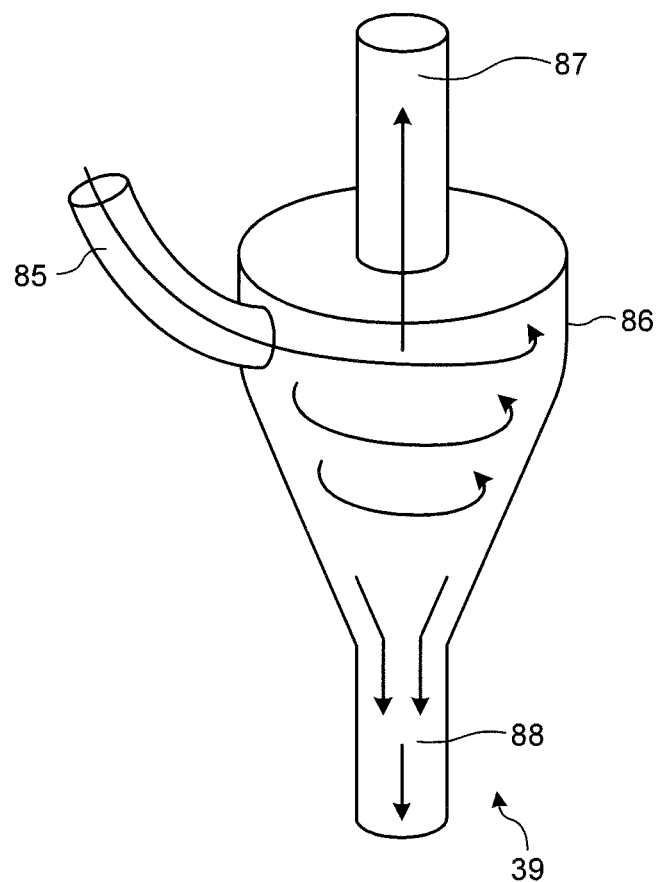
FIG. 8 is a schematic diagram illustrating an example of a powder collection unit.

FIG. 8 is a schematic diagram illustrating an example of the powder collection unit 39. As illustrated in FIG. 8, the powder collection unit 39 includes an introduction part 85, a cyclone part 86, a gas discharge part 87, and a powder discharge part 88. The introduction part 85 is, for example, a tubular member and one end thereof is connected to, for example, the inside of the three-dimensional deposition chamber 2. The cyclone part 86 is, for example, a hollow truncated conical member and is formed so that a diameter decreases as it goes downward in, for example, the vertical direction. The other end of the introduction part 85 is connected to the cyclone part 86 in a tangential direction of an outer periphery of the cyclone part 86. The gas discharge part 87 is a tubular member and one end thereof is connected to an upper end of the cyclone part 86 in the vertical direction. The powder discharge part 88 is a tubular member and one end thereof is connected to a lower end of the cyclone part 86 in the vertical direction.

For example, a pump which suctions a gas is connected to the other end of the gas discharge part 87. Thus, the gas discharge part 87 suctions a gas from the cyclone part 86 to form a negative pressure in the cyclone part 86. Since the cyclone part 86 has a negative pressure, the introduction part 85 suctions a gas from the three-dimensional deposition chamber 2. The introduction part 85 suctions the powder P which is not used to form the formed layer along with the gas inside the three-dimensional deposition chamber 2. The introduction part 85 is connected to the cyclone part 86 in the tangential direction of the outer periphery of the cyclone part 86. Thus, the gas and the powder P which are suctioned to the introduction part 85 turn along an inner periphery of the cyclone part 86. Since the powder P has a specific weight higher than that of the gas, the powder is centrifugally separated outward in a radiation direction at the inner periphery of the cyclone part 86. The powder P is directed toward the lower powder discharge part 88 in an extension direction by the own weight and is discharged from the powder discharge part 88. Further, the gas is discharged by the gas discharge part 87.

The powder collection unit 39 collects the powder P which is not used to form the formed layer in this way. Further, the powder collection unit 39 of the embodiment may separately collect the powder P in accordance with each specific weight. For example, since the powder having a low specific weight has a small weight, the powder is not directed toward the powder discharge part 88 and is suctioned to the gas discharge part 87. Thus, the powder collection unit 39 can separately collect the powder P in accordance with the specific weight. Additionally, the powder collection unit 39 is not limited to such a configuration as long as the powder P which is not used to form the formed layer can be collected.

Next, a three-dimensional object manufacturing method using the three-dimensional deposition device 1 will be described. FIG. 9 is a schematic diagram illustrating the three-dimensional object manufacturing method by the three-dimensional deposition device 1 according to the embodiment. The manufacturing method illustrated in FIG. 9 can be performed by the control to the operations of the components of the control device 20. In the embodiment, a case will be described in which a three-dimensional object is manufactured on a pedestal 91. The pedestal 91 is, for example, a metallic plate-shaped member, but the shape and the material thereof may be arbitrarily set as long as the three-dimensional object is formed thereon. The pedestal 91 is attached on the base unit 100. The base unit 100 is fixed to the rotation table unit 17 of the table unit 11 along with the pedestal 91. Additionally, the pedestal 91 can be set as the base unit 100.

As illustrated in step S1, the control device 20 moves the base unit 100 so that the pedestal 91 on the base unit 100 is disposed below the deposition head 12 in the Z-axis direction by the table unit 11.

Next, as illustrated in step S2, the control device 20 introduces the powder from the powder introduction unit 35 into the deposition head 12 and emits the laser beam L while injecting the powder P from the deposition head 12 along with the gas. The powder P has a predetermined convergence diameter and is injected toward the pedestal 91 of the base unit 100. The laser beam L is emitted to the powder P with a predetermined spot diameter between the deposition head 12 and the pedestal 91. Here, the position of the spot diameter of the laser beam L in the Z-axis direction with respect to the position of the convergence diameter of the powder P in the Z-axis direction and the spot diameter at the position of the convergence diameter of the powder P in the Z-axis direction can be controlled by, for example, the movement of the position of the light concentrating unit 49.

As illustrated in step S3, the control device 20 injects the powder P from the deposition head 12 while emitting the laser beam L so that the powder P is melted by the irradiation with the laser beam L. The melted powder P which is a molten body A falls downward in the Z-axis direction toward the pedestal 91 of the base unit 100.

The molten body A which falls downward in the Z-axis direction reaches a predetermined position of the pedestal 91 of the base unit 100. The molten body A on the pedestal 91 is cooled at a predetermined position on the pedestal 91 by, for example, heat radiation. As illustrated in step S4, the cooled molten body A is solidified as a solid body B on the pedestal 91.

The control device 20 forms the solid body B on the base unit 100 by the deposition head 12 according to a sequence from step S2 to step S4 while moving the base unit 100 to a predetermined position by the table unit 11. When these sequences are repeated, as illustrated in step S5, the solid body B forms a formed layer 92 having a predetermined shape on the pedestal 91.

As illustrated in step S6, the control device 20 moves the pedestal 91 of the base unit 100 by the table unit 11 so that the formed layer 92 formed on the pedestal 91 is disposed below the machining unit 13 in the Z-axis direction. Further, the control device 20 performs a machining operation on the formed layer 92 by the machining unit 13. The control device 20 determines whether to perform a machining operation by the machining unit 13. If this machining operation is not necessary, the machining operation may not be performed. Thus, there is a case where the machining operation illustrated in step S6 is not performed in accordance with the instruction of the control device 20.

Next, as illustrated in step S7, the control device 20 moves the pedestal 91 of the base unit 100 by the table unit 11 so that the formed layer 92 formed on the pedestal 91 is disposed below the deposition head 12 in the Z-axis direction. Then, the sequence from step S2 to step S6 is repeated so that a formed layer 93 is sequentially deposited on the formed layer 92 and thus the three-dimensional object is manufactured.

From the description above, the three-dimensional deposition device 1 according to the embodiment manufactures the three-dimensional object as below. The powder injection unit 43 of the deposition head 12 injects the powder P toward the pedestal 91 of the base unit 100. Further, the inner tube 42 of the deposition head 12 irradiates the powder P provided between the deposition head 12 and the pedestal 91 with the laser beam L. The powder P which is irradiated with the laser beam L is melted and solidified on the pedestal 91 of the base unit 100 and thus the formed layer 92 is formed. The three-dimensional deposition device 1 sequentially deposits the formed layer 93 on the formed layer 92 and performs an appropriate machining operation on the formed layers 92 and 93 by the machining unit 13 to manufacture the three-dimensional object.

In the embodiment, the three-dimensional object is manufactured on the pedestal 91, but the three-dimensional object may not be manufactured on the pedestal 91. The three-dimensional object may be directly manufactured on, for example, the base unit 100. Further, the three-dimensional deposition device 1 may perform so-called overlay welding by depositing a formed layer on an existing shaped material.

Figure 10A:
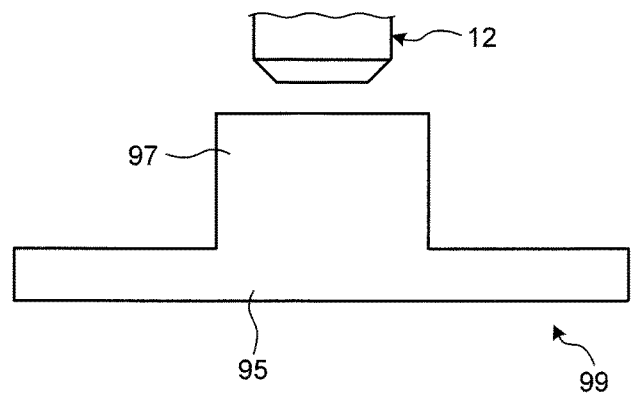
FIG. 10A is an explanatory diagram illustrating the method of manufacturing the three-dimensional object by the three-dimensional deposition device according to the embodiment.
Figure 10B:
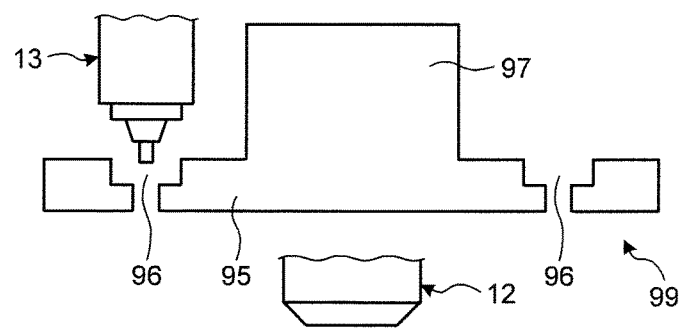
FIG. 10B is an explanatory diagram illustrating the method of manufacturing the three-dimensional object by the three-dimensional deposition device according to the embodiment.
Figure 10C:
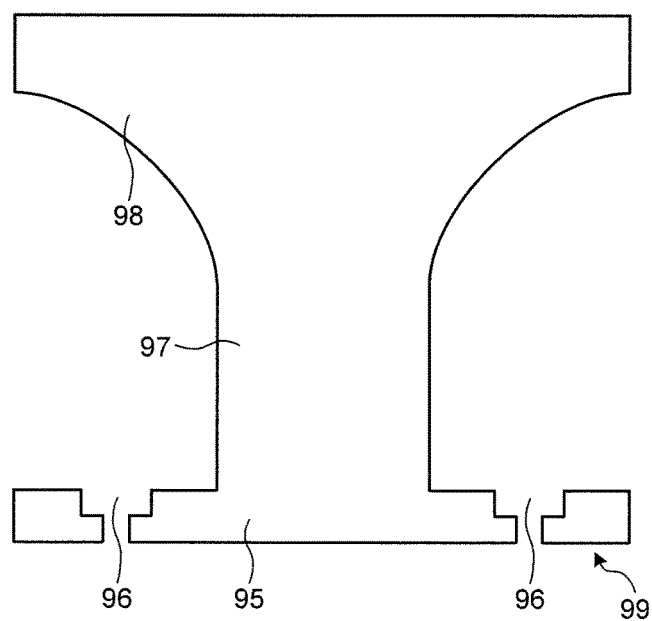
FIG. 10C is an explanatory diagram illustrating the method of manufacturing the three-dimensional object by the three-dimensional deposition device according to the embodiment.

In the embodiment, the machining unit 13 is used to perform, for example, a machining operation on the surface of the formed layer 92, but may perform a machining operation on the other part. FIGS. 10A to 10C are schematic diagrams illustrating a three-dimensional object manufacturing method by the three-dimensional deposition device 1 according to the embodiment. FIGS. 10A to 10C illustrate a sequence of manufacturing a member 99 illustrated in FIG. 10C by the three-dimensional deposition device 1.

The member 99 includes a disc part 95, a shaft part 97, and a truncated conical part 98. Further, the member 99 is formed so that a threaded hole 96 is formed in the disc part 95. As illustrated in FIG. 10C, the disc part 95 is a disc-shaped member. The shaft part 97 is a shaft-shaped member that has a diameter smaller than that of the disc part 95 and extends from a center of one face of the disc part 95. The threaded hole 96 is provided at the outside of the shaft part 97 of the disc part 95. The truncated conical part 98 is provided at a front end of the shaft part 97 and is formed so that an outer diameter increases as it goes toward an opposite side to the disc part 95. A long diameter of the truncated conical part 98 is equal to, for example, an outer diameter of the disc part 95. That is, the threaded hole 96 is located at the inside of the long diameter of the truncated conical part 98.

Next, a sequence of manufacturing the member 99 by the three-dimensional deposition device 1 will be described. As illustrated in FIG. 10A, the three-dimensional deposition device 1 forms the disc part 95 and the shaft part 97 by depositing the formed layer through the deposition head 12. After the disc part 95 and the shaft part 97 are manufactured, the three-dimensional deposition device 1 forms the threaded hole 96 by the machining unit 13 as illustrated in FIG. 10B. After the threaded hole 96 is formed, the three-dimensional deposition device 1 forms the truncated conical part 98 on the shaft part 97 by depositing the formed layer through the deposition head 12. The member 99 is manufactured in this way.

Here, a long diameter part of the truncated conical part 98 is located at the outside of the threaded hole 96. In other words, an area above the threaded hole 96 is covered by the truncated conical part 98. Thus, for example, when the member 99 is manufactured by a machining operation, a processing tool for the threaded hole 96 cannot be moved from an area above the truncated conical part 98 toward the disc part 95. However, the three-dimensional deposition device 1 forms the threaded hole 96 before the truncated conical part 98 is manufactured. In this case, the area above the threaded hole 96 is not covered. Thus, the three-dimensional deposition device 1 can process the threaded hole 96 by moving the machining unit 13 along the Z-axis direction from above in the Z-axis direction. In this way, the machining unit 13 can easily perform a machining operation by adjusting timing for the formed layer forming operation and the machining operation.

Figure 11:
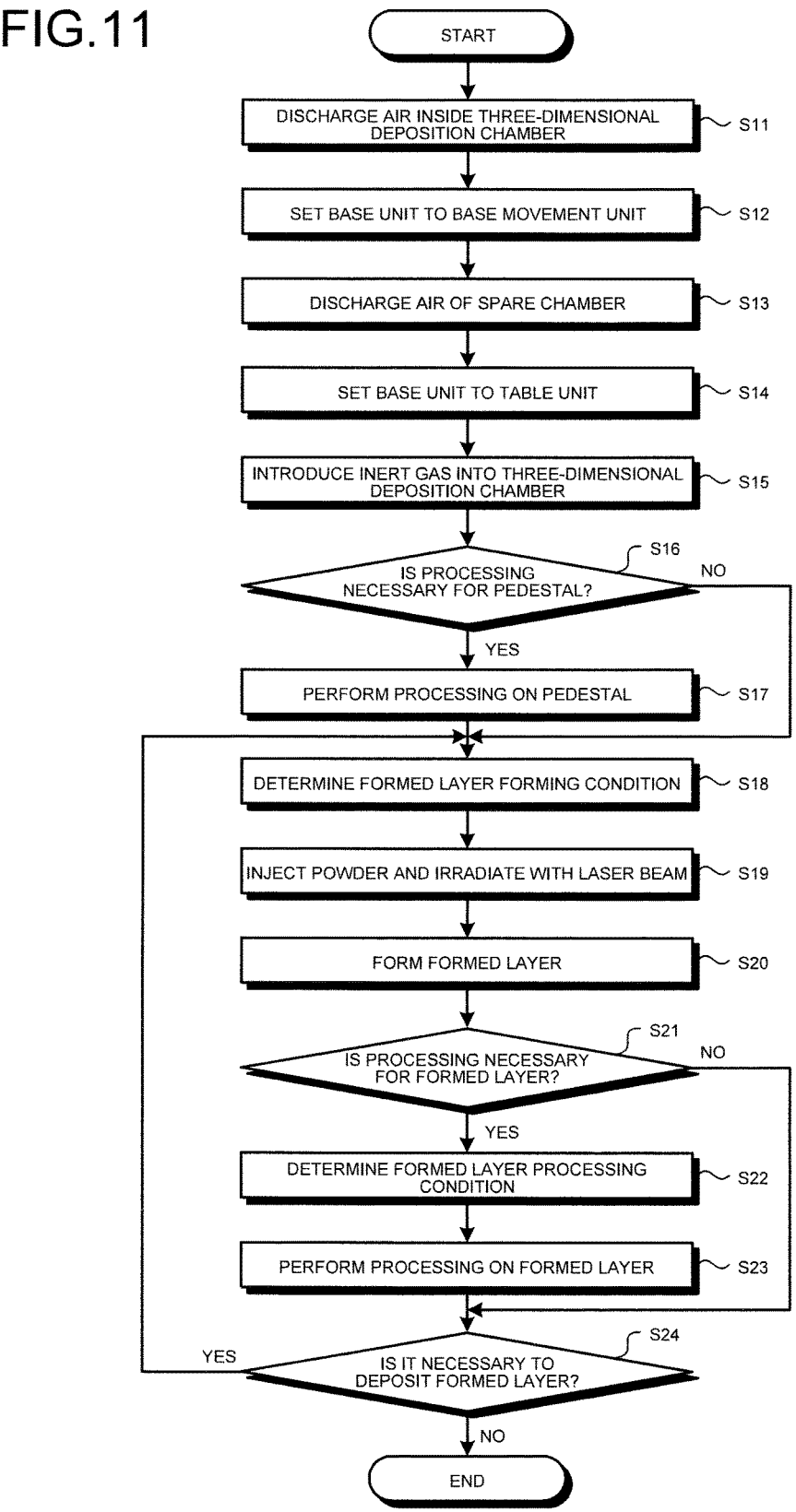
FIG. 11 is a flowchart illustrating a step of manufacturing the three-dimensional object by the three-dimensional deposition device according to the embodiment.

Next, a detailed process of manufacturing the three-dimensional object by the three-dimensional deposition device 1 according to the embodiment will be described. FIG. 11 is a flowchart illustrating a step of manufacturing the three-dimensional object by the three-dimensional deposition device 1 according to the embodiment. The control device 20 reads, for example, the three-dimensional object design information stored in the storage unit 53.

Next, the control device 20 discharges air in the three-dimensional deposition chamber 2 by the air discharge unit 37 (step S11). Here, the three-dimensional deposition chamber 2 is separated from the spare chamber 3 while the door 6 is closed. Further, in the three-dimensional deposition chamber 2, a part which communicates with the other external air is also closed and sealed. For example, the control device 20 discharges air from the air discharge unit 37 so that an oxygen concentration in the three-dimensional deposition chamber 2 is 100 ppm or less and desirably 10 ppm or less. The control device 20 can set an inert state by changing the oxygen concentration inside the three-dimensional deposition chamber 2 to 100 ppm or less and further reliably set an inert state by changing the oxygen concentration to 10 ppm or less.

Next, the base unit 100 with the pedestal 91 is attached to the base movement unit 36 in the spare chamber 3 (step S12). The three-dimensional deposition device 1 may perform a process in step S12 prior to a process in step S11.

After the base movement unit 36 in the spare chamber 3 is attached, the control device 20 closes the door 7 of the spare chamber 3 and discharges air inside the spare chamber 3 by the air discharge unit 25 (step S13). The control device 20 discharges air by the air discharge unit 25 so that the oxygen concentration in the spare chamber 3 decreases. It is desirable that the oxygen concentration inside the spare chamber 3 be equal to, for example, the oxygen concentration inside the three-dimensional deposition chamber 2.

When the air of the spare chamber 3 is completely discharged, the control device 20 opens the door 6 of the three-dimensional deposition chamber 2 and attaches the base unit 100 to the rotation table unit 17 inside the three-dimensional deposition chamber 2 by the base movement unit 36 (step S14). The base unit 100 is fixed to the rotation table unit 17. After the base unit 100 is attached to the rotation table unit 17, the control device 20 returns the base movement unit 36 into the spare chamber 3 and closes the door 6.

After the base unit 100 is set to the rotation table unit 17, the control device 20 introduces a gas into the three-dimensional deposition chamber 2 by the gas introduction unit 38 (step S15). In the embodiment, the gas which is introduced by the gas introduction unit 38 is an inert gas such as nitrogen or argon. The gas introduction unit 38 introduces the inert gas so that the residual oxygen concentration in the three-dimensional deposition chamber 2 becomes 100 ppm or less.

Further, the three-dimensional deposition device 1 may omit step S11, step S13, and step S15 in accordance with the type of powder material. For example, when any problem does not occur in the quality of the three-dimensional object even by the oxidization of the powder material, these steps may be omitted so that the three-dimensional deposition chamber 2 and the spare chamber 3 have atmospheric air. Further, step S13 and step S15 may be continued even after step S16. That is, the air discharge unit 37 may appropriately discharge air from the three-dimensional deposition chamber 2 while the three-dimensional object is manufactured. Further, the gas introduction unit 38 may appropriately introduce an inert gas into the three-dimensional deposition chamber 2 while the three-dimensional object is manufactured.

When the inert gas is completely introduced into the three-dimensional deposition chamber 2, the control device 20 determines whether to perform a machining operation on the pedestal 91 of the base unit 100 (step S16). For example, the control device 20 measures a surface shape of the pedestal 91 by the shape measurement unit 30. The control device 20 determines whether to perform a machining operation on the pedestal 91 based on a measurement result of the shape measurement unit 30. For example, when surface roughness of the pedestal 91 is larger than a predetermined value, the control device 20 determines that the machining operation is performed on the pedestal 91. Here, the determination on whether the machining operation needs to be performed on the pedestal 91 by the control device 20 is not limited thereto and may not be performed by the measurement result of the shape measurement unit 30. The control device 20 may store, for example, information of the pedestal 91 in the storage unit 53. The control device 20 may determine whether the pedestal 91 needs to be processed based on the information of the pedestal 91 and the three-dimensional object design information. The control device 20 may be set to process the pedestal 91 at all times.

When the control device 20 determines that the machining operation for the pedestal 91 is needed (Yes in step S16), the control device 20 performs the machining operation for the pedestal 91 at a predetermined condition by the machining unit 13 (step S17). The control device 20 determines a condition of the machining operation for the pedestal 91 based on, for example, the shape measurement result of the pedestal 91 obtained by the shape measurement unit 30 or the information of the pedestal 91 and the three-dimensional object design information.

When the control device 20 determines that the processing for the pedestal 91 is not needed (No in step S16) or the machining operation for the pedestal 91 is performed at a predetermined condition, the control device 20 determines the formed layer forming condition based on, for example, the three-dimensional object design information read from the storage unit 53 (step S18). For example, the formed layer forming condition is a condition necessary to form the formed layer and includes a shape of each formed layer, a type of powder P, an injection speed of the powder P, an injection pressure of the powder P, an irradiation condition of the laser beam L, a positional relation among a convergence diameter of the powder P, a spot diameter of the laser beam L, and a formed layer surface, a dimension and a temperature of the melted powder P in air, a dimension of a molten pool formed on a formed layer surface, a cooling speed, or a movement speed of the base unit 100 using the table unit 11.

After the control device 20 determines the formed layer forming condition, the control device 20 injects the powder P toward the pedestal 91 of the base unit 100 and starts emitting the laser beam L thereto by the deposition head 12 (step S19). Since the control device 20 emits the laser beam L while injecting the powder P, the powder P is melted by the laser beam L and the melted powder P can be solidified. Thus, the solid body B is formed on the pedestal 91.

The control device 20 forms the formed layer 92 on the pedestal 91 by moving the base unit 100 using the table unit 11 while injecting the powder P and emitting the laser beam L (step S20). The control device 20 may heat the formed layer 92 or a part to which the solid body B has not been adhered by the heating head 31.

After the formed layer 92 is formed, the control device 20 determines whether a machining operation for the formed layer 92 is needed (step S21). For example, the control device 20 causes the shape measurement unit 30 to measure the surface shape of the formed layer 92. The control device 20 determines whether the machining operation for the formed layer 92 is needed based on the measurement result of the shape measurement unit 30. For example, when the surface roughness of the formed layer 92 is larger than a predetermined value, the control device 20 determines that the machining operation for the formed layer 92 is performed. However, the determination reference of the necessity of the machining operation for the formed layer 92 is not limited thereto. For example, the control device 20 may determine whether the machining operation for the formed layer 92 is needed based on the three-dimensional object design information and the formed layer forming condition. For example, when the surface roughness of the formed layer 92 calculated from the formed layer forming condition is larger than the necessary surface roughness based on the three-dimensional object design information, the control device 20 may determine that the machining operation for the formed layer 92 is needed.

When the control device 20 determines that the machining operation for the formed layer 92 is not needed (No in step S21), a process proceeds to step S24. When the control device 20 determines that the machining operation for the formed layer 92 is needed (Yes in step S21), the control device 20 determines a processing condition of the machining operation for the formed layer 92 (step S22). For example, the control device 20 determines the processing condition based on the measurement result of the shape measurement unit 30, or based on the three-dimensional object design information and the condition of forming the formed layer 92, or the like. After the control device 20 determines the formed layer processing condition, the control device 20 performs the machining operation for the formed layer 92 by the machining unit 13 based on the determined processing condition (step S23).

When the control device 20 performs the machining operation for the formed layer 92 or determines that the machining operation for the formed layer 92 is not needed, the control device determines whether to further deposit the formed layer 93 on the formed layer 92 (step S24). The control device 20 determines whether to further deposit the formed layer 93 on the formed layer 92 based on, for example, the three-dimensional object design information read from the storage unit 53.

When the control device 20 determines that the deposition of the formed layer 93 is needed (Yes in step S24), the process returns to step S18 and the formed layer 93 is deposited on the formed layer 92. When the control device 20 determines that the deposition of the formed layer 93 is not needed (No in step S24), the manufacture of the three-dimensional object is completed.

The three-dimensional deposition device 1 manufactures the three-dimensional object in this way. The three-dimensional deposition device 1 according to the embodiment manufactures the three-dimensional object by injecting the powder P through the deposition head 12 and irradiating the powder P with the laser beam L. The three-dimensional deposition device 1 can perform an appropriate machining operation on the formed layer 92 by the machining unit 13. Thus, the three-dimensional deposition device 1 can manufacture the three-dimensional object with high accuracy.

The base movement unit 36 moves the base unit 100 into the three-dimensional deposition chamber 2. There is a case where air is discharged in the three-dimensional deposition chamber 2. For example, even when the operator does not enter the three-dimensional deposition chamber 2, the base movement unit 36 can move the base unit 100 in the three-dimensional deposition chamber 2.

Figure 12:
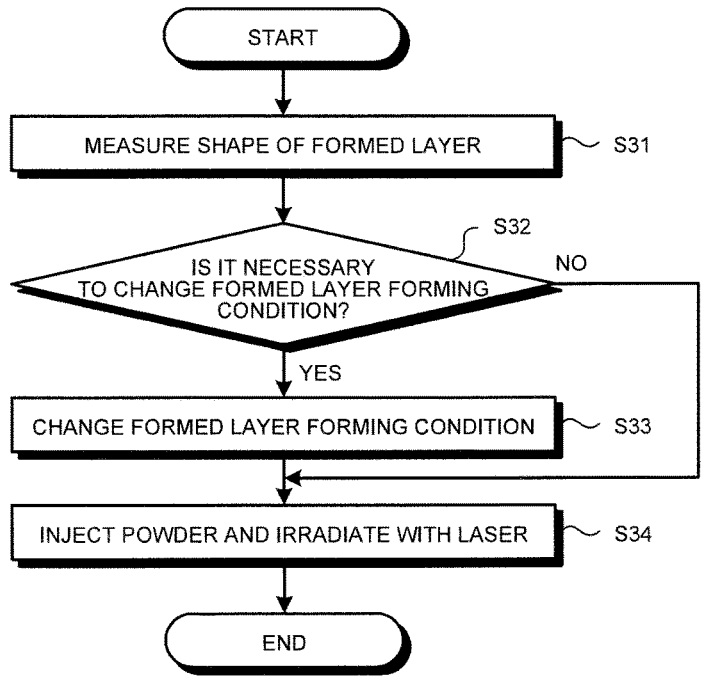
FIG. 12 is a flowchart illustrating an example of a step of changing a formed layer forming condition in the three-dimensional deposition device according to the embodiment.

Further, the three-dimensional deposition device 1 can further include a step of changing the formed layer forming condition by the shape measurement unit 30. FIG. 12 is a flowchart illustrating an example of the step of changing the formed layer forming condition by the three-dimensional deposition device 1 according to the embodiment. First, the control device 20 measures a shape of the formed layer 92 by the shape measurement unit 30 (step S31). The control device 20 may measure the shape of the formed layer 92 by the shape measurement unit 30 while forming the formed layer by the deposition head 12. The shape measurement unit 30 can measure both a shape of a position where the solid body B is to be formed by the deposition head 12 and a shape of the solid body B formed at that position. That is, the shape measurement unit 30 can measure a surface shape before and after the formed layer 92 is formed.

When the shape of the formed layer is measured, the control device 20 determines whether to change the formed layer forming condition based on the measurement result of the shape measurement unit 30 (step S32). The control device 20 determines whether to change a distance between the deposition head 12 and the position where the solid body B is to be formed by the deposition head 12 based on, for example, the measurement result of the surface shape of the position where the solid body B is to be formed by the deposition head. For example, when the surface shape of the position where the solid body B is to be formed by the deposition head 12 is different from a surface shape at a different position, the control device 20 changes a position of the deposition head 12 so that a distance between a position where the formed layer is to be formed and the deposition head 12 becomes uniform. Further, for example, the control device 20 determines whether to change, for example, the injection condition of the powder P or the irradiation condition of the laser beam L based on the shape measurement result of the formed solid body B. For example, when the shape of the formed solid body B is not appropriate by the comparison with the three-dimensional object design information, the control device 20 appropriately changes the injection condition of the powder P or the irradiation condition of the laser beam L.

When the control device 20 determines that the formed layer forming condition needs to be changed (Yes in step S32), the control device 20 changes the formed layer forming condition (step S33).

When the control device 20 changes the formed layer forming condition or determines that the formed layer forming condition does not need to be changed (No in step S32), the base unit 100 is moved by the table unit 11 while the deposition head 12 injects the powder P and emits the laser beam L so as to form the formed layer (step S34). In this way, the step of changing the formed layer forming condition by the shape measurement unit 30 ends.

The control device 20 changes and determines the formed layer forming condition in response to the measurement result of the surface shape of the formed layer by the shape measurement unit 30 and controls the operation of the deposition head 12. Thus, the three-dimensional deposition device 1 can further appropriately form the formed layer, for example by setting a uniform distance between the formed layer forming position and the deposition head 12 as described above. Further, the three-dimensional deposition device 1 can measure the shape of the formed layer 92 by the shape measurement unit 30 while forming the formed layer by the deposition head 12. Thus, the three-dimensional deposition device 1 can further appropriately set the formed layer forming condition and thus manufacture the three-dimensional object with higher accuracy.

Figure 13:
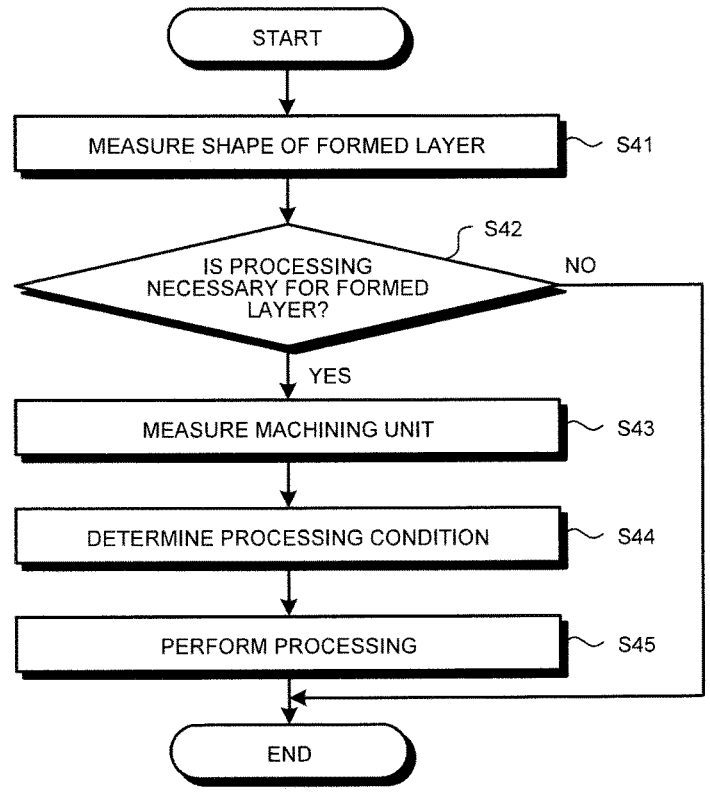
FIG. 13 is a flowchart illustrating an example of a step of determining a formed layer processing condition in the three-dimensional deposition device according to the embodiment.

Further, the three-dimensional deposition device 1 can further include a step of determining a processing condition of the machining operation by measuring a position of the front end 56 of the machining unit 13 using the machine measurement unit 32. FIG. 13 is a flowchart illustrating an example of the step of determining the formed layer processing condition by the three-dimensional deposition device 1 according to the embodiment.

The control device 20 measures a shape of the formed layer 92 by the shape measurement unit 30 (step S41). The control device 20 determines whether the machining operation for the formed layer 92 is needed based on the measurement result of the shape measurement unit 30 (step S42).

When the control device 20 determines the machining operation for the formed layer 92 is needed (Yes in step S42), the control device 20 measures the position of the front end 56 of the tool 22 of the machining unit 13 by the machine measurement unit 32 (step S43).

The control device 20 determines the processing condition of the formed layer 92 from the measurement result of the shape of the formed layer 92 obtained by the shape measurement unit 30 and the position of the front end 56 of the machining unit 13 obtained by the machine measurement unit 32 (step S44). Additionally, the control device 20 may determine the processing condition of the formed layer 92 based on any one of the shape of the formed layer 92 obtained by the shape measurement unit 30 and the position of the front end 56 of the machining unit 13 obtained by the machine measurement unit 32. The control device 20 determines a processing amount of the machining unit 13 based on the shape of the formed layer 92 obtained by the shape measurement unit 30. Since the control device 20 determines the processing amount, the control device 20 determines a movement track of the machining unit 13 in the Z-axis direction and a movement track of the base unit 100 using the table unit 11.

Next, after the control device 20 determines the processing condition, the control device 20 performs the machining operation for the formed layer 92 by the machining unit 13 (step S45) and the step ends. Further, even when the control device 20 determines the machining operation for the formed layer 92 is not needed (No in step S42), the step ends.

In this way, the control device 20 determines a formed layer cutting condition based on the measurement result of the surface shape of the formed layer 92 obtained by the shape measurement unit 30 and the measurement result of the front end 56 of the machining unit 13 obtained by the machine measurement unit 32. The control device 20 then controls the operation of the machining unit 13. Thus, the three-dimensional deposition device 1 can perform an appropriate machining operation for the formed layer 92 by appropriately calculating the processing condition of the machining operation for the formed layer 92.

Further, the machine measurement unit 32 measures the position of the front end 56 of the tool 22 of the machining unit 13 by capturing an image. Thus, the machine measurement unit 32 can measure the position of the front end while operating the machining unit 13. The machine measurement unit 32 can further measure the position of the front end 56 in consideration of a change in position of the front end 56 of the tool 22 of the machining unit 13 due to thermal expansion. For example, a case is considered where an error of the measurement result of the position of the front end 56 of the tool 22 of the machining unit 13 is larger than the necessary machining margin of the formed layer 92. In this case, there is a possibility that the formed layer 92 is not processed even after the machining operation for the formed layer 92 and the machining margin increases too much. However, the three-dimensional deposition device 1 according to the embodiment can suppress a measurement error of the position of the front end 56 of the machining unit 13 by the machine measurement unit 32. Therefore, the machining operation for the formed layer 92 can be further appropriately performed.

For example, even when the control device 20 controls the deposition head 12 so that a thickness of the formed layer 92 in the Z-axis direction becomes 0.2 mm, there is a case where the thickness of the actually formed formed layer 92 in the Z-axis direction has an error of 0.2 mm to maximum. For example, the thickness becomes equal to or larger than 0.1 mm and equal to or smaller than 0.3 mm. Further, there is a case where the position of the front end 56 of the tool 22 changes by thermal expansion and an error of a change in position of the front end 56 of the tool 22 due to the thermal expansion becomes, for example, 0.1 mm to maximum. Thus, for example, the case is considered where a process of removing a defective portion formed on the surface of the formed layer 92 is performed without using the shape measurement unit 30 and the machine measurement unit 32. In this case, there is a need that the control device 20 generates an instruction so that the machining unit 13 performs a removing operation with a processing margin of 0.3 mm or more in consideration of a maximal error of a change in position of the tool 22 and the thickness of the formed layer 92. Here, when the thickness of the formed layer 92 is 0.2 mm, the processing margin is 0.3 mm or more. For this reason, there is a possibility that the formed layer 92 including a normal part is entirely removed and the formed layer below the formed layer 92 is also processed. However, when a removing operation is performed on the surface of the formed layer 92 by using the shape measurement unit 30 and the machine measurement unit 32, the shape measurement unit 30 and the machine measurement unit 32 can measure a change in position of the tool 22 due to thermal expansion and the actual thickness of the formed layer 92. Thus, the control device 20 does not need to consider a maximal error of a change in position of the tool 22 and the thickness of the formed layer 92 and thus the machining unit 13 can appropriately remove only a defect on the surface of the formed layer 92.

Figure 14:
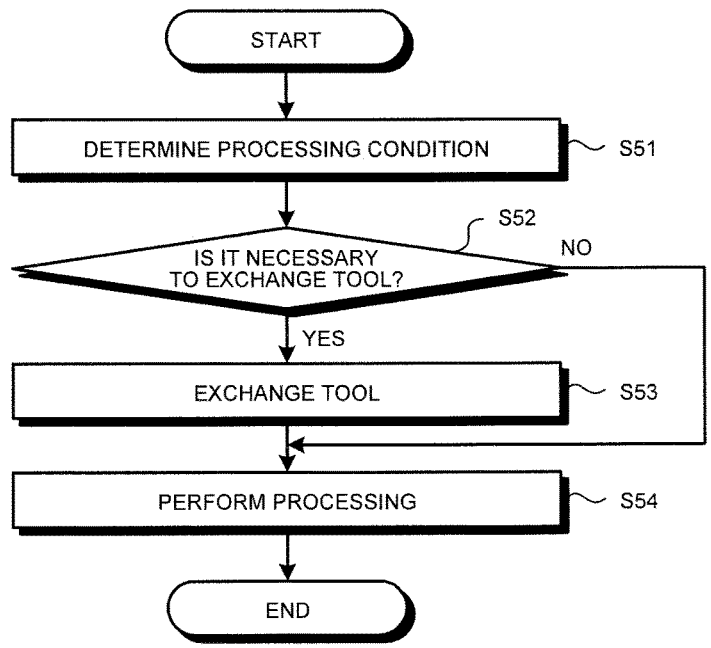
FIG. 14 is a flowchart illustrating an example of a step of exchanging a front end of a machining unit in the three-dimensional deposition device according to the embodiment.

Further, the three-dimensional deposition device 1 can further include a step of exchanging the tool 22 of the machining unit 13 by the tool exchange unit 33. FIG. 14 is a flowchart illustrating an example of the step of exchanging the tool 22 of the machining unit 13 in the three-dimensional deposition device 1 according to the embodiment. The control device 20 determines a processing condition of the machining operation for the formed layer 92 (step S51). The determination of the processing condition in step S51 is performed by, for example, the same determination method for the processing condition in step S44 of FIG. 13.

After the control device 20 determines the processing condition, the control device 20 determines whether to exchange the tool 22 of the machining unit 13 based on the determined processing condition of the formed layer 92 (step S52). For example, when the control device 20 determines that the formed layer 92 needs to be processed with higher accuracy, the control device 20 determines that the tool 22 of the machining unit 13 needs to be exchanged with a tool having a small blade. Further, for example, when the processing condition is changed, the control device 20 determines that the tool 22 of the machining unit 13 needs to be exchanged. For example, when a threaded hole is processed in the formed layer 92 after the surface of the formed layer 92 is processed by the machining unit 13, the control device 20 determines that the tool 22 of the machining unit 13 needs to be exchanged from a surface processing tool to a threaded hole processing tool. However, a condition for the determination on whether to exchange the tool 22 of the machining unit 13 is not limited thereto.

When the control device 20 determines that the tool 22 of the machining unit 13 needs to be exchanged (Yes in step S52), the control device 20 exchanges the tool 22 of the machining unit 13 by the tool exchange unit 33 (step S53).

After the control device 20 exchanges the tool 22 of the machining unit 13, the machining operation for the formed layer 92 is performed by the machining unit 13 having an exchanged tool (step S54) and the step ends. Further, when the control device 20 determines that the tool 22 of the machining unit 13 does not need to be exchanged (No in step S52), the machining operation for the formed layer 92 is performed by the machining unit 13 having the same tool (step S54) and the step ends.

In this way, the tool exchange unit 33 can exchange the tool 22 of the machining unit 13 based on the determined processing condition of the formed layer 92. Thus, the three-dimensional deposition device 1 according to the embodiment can further appropriately and easily perform the machining operation for the formed layer 92.

Figure 15:
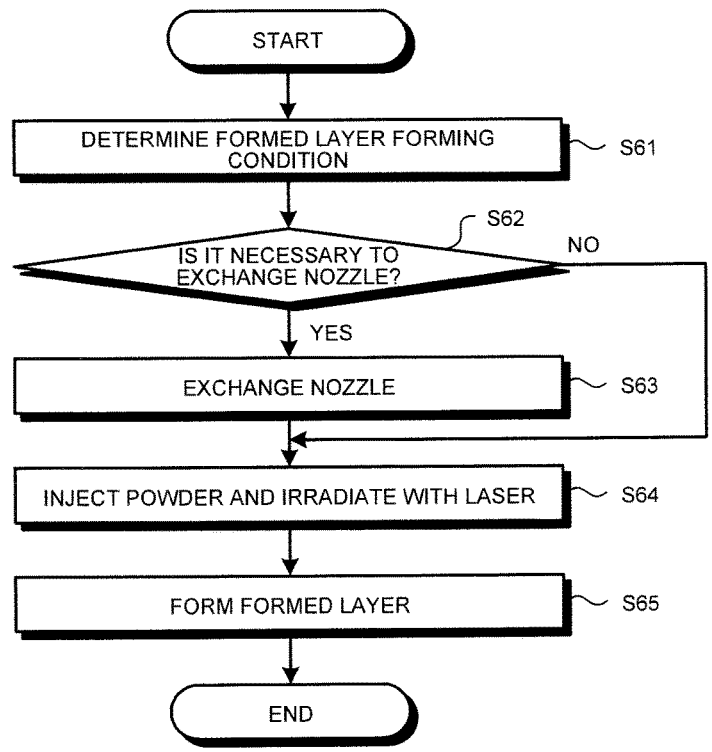
FIG. 15 is a flowchart illustrating an example of a step of exchanging a front end of a deposition head in the three-dimensional deposition device according to the embodiment.

Further, the three-dimensional deposition device 1 can further include a step of exchanging the nozzle 23 of the deposition head 12 by the nozzle exchange unit 34. FIG. 15 is a flowchart illustrating an example of a step of exchanging the nozzle 23 of the deposition head 12 in the three-dimensional deposition device 1 according to the embodiment. First, the control device 20 determines a condition of forming the formed layer 92 (step S61). The determination of the processing condition in step S61 is performed by, for example, the same determination method for the condition of forming the formed layer 92 in step S18 of FIG. 11.

Since the forming condition is determined, the control device 20 determines whether to exchange the nozzle 23 of the deposition head 12 based on the determined condition of forming the formed layer 92 (step S62). For example, when the determined condition of forming the formed layer 92 is to improve the accuracy of forming the formed layer 92, the control device 20 determines that the tool 22 of the machining unit 13 needs to be exchanged with a tool emitting the laser beam L to have a small spot diameter or a tool injecting the powder P to have a small convergence diameter. However, the determination condition on whether to exchange the nozzle 23 of the deposition head 12 is not limited thereto.

After the control device 20 determines that the nozzle 23 of the deposition head 12 needs to be exchanged (Yes in step S62), the control device 20 exchanges the nozzle 23 of the deposition head 12 by the nozzle exchange unit 34 (step S63).

After the nozzle 23 of the deposition head 12 is exchanged, the control device 20 injects the powder P and emits the laser beam L by the deposition head 12 having an exchanged nozzle 23 (step S64). In this way, the formed layer is formed (step S65) and the step ends. When the control device 20 determines that the nozzle 23 of the deposition head 12 does not need to be exchanged (No in step S62), the control device 20 injects the powder P and emits the laser beam L by the deposition head 12 having the same nozzle (step S64). In this way, the formed layer is formed (step S65) and the step ends.

In this way, the three-dimensional deposition device 1 can exchange the nozzle 23 of the deposition head 12 based on the condition of forming the formed layer 92 determined by the nozzle exchange unit 34. Thus, the three-dimensional deposition device 1 according to the embodiment can further appropriately and easily form the formed layer 92.

Figure 16:
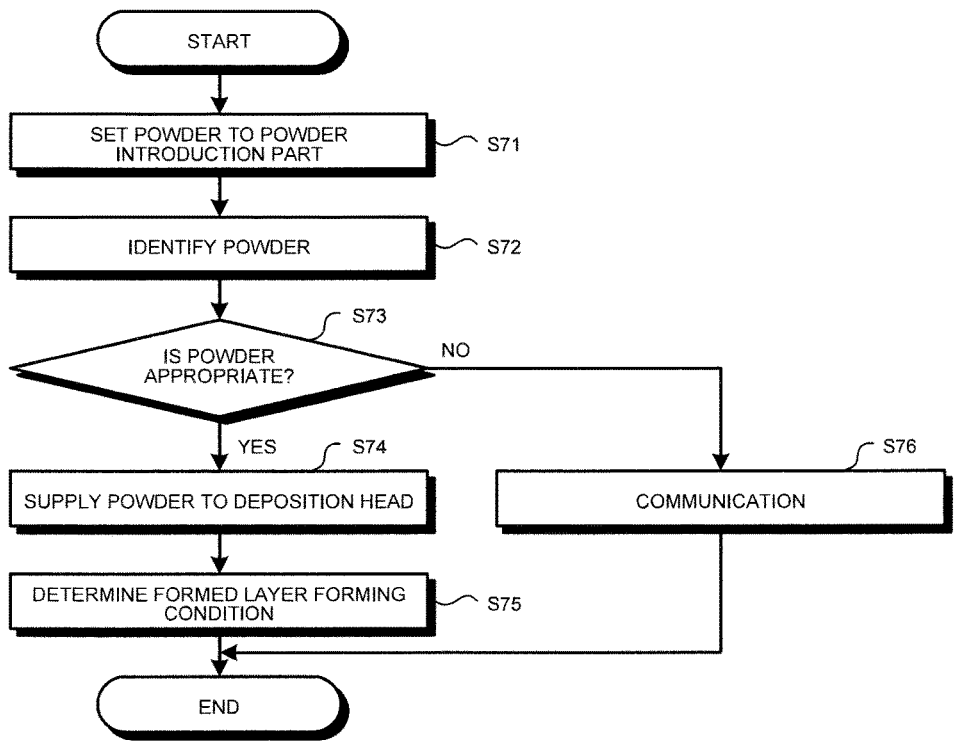
FIG. 16 is a flowchart illustrating an example of a powder identifying process in the three-dimensional deposition device according to the embodiment.

Further, the three-dimensional deposition device 1 can further include a step of identifying the powder introduced into the deposition head 12 by the powder introduction unit 35. FIG. 16 is a flowchart illustrating an example of the step of identifying the powder by the three-dimensional deposition device 1 according to the embodiment. The control device 20 detects a state where the powder is set to the powder introduction unit 35 (step S71). For example, the control device detects a state where the cartridge 83 having the powder received therein is stored in the powder storage unit 81.

After the powder is set, the control device 20 identifies the powder by the powder identification unit 82 of the powder introduction unit 35 (step S72). For example, the control device 20 reads the material display part 84 of the cartridge 83 by the powder identification unit 82 of the powder introduction unit 35. The control device 20 then detects the powder information necessary for manufacturing the three-dimensional object such as a type, a particle size, a weight, and purity of powder or an oxide coating of powder. The control device 20 may identify the powder inside the powder introduction unit 35A by the powder identification unit 82A of the powder introduction unit 35A.

After the control device 20 identifies the powder, the control device 20 determines whether the powder inside the powder introduction unit 35 is appropriate based on the powder identification result (step S73). The control device 20 determines whether the powder inside the powder introduction unit 35 is appropriate based on, for example, the three-dimensional object design information. For example, when the powder inside the powder introduction unit 35 is not appropriate to manufacture the three-dimensional object, the control device 20 determines that the powder inside the powder introduction unit 35 is not appropriate.

When the control device 20 determines that the powder is appropriate (Yes in step S73), the control device 20 introduces the powder into the deposition head 12 by the powder introduction unit 35 (step S74).

Next, the control device 20 determines the condition of forming the formed layer 92 based on the powder information identified in step S72 (step S75) and the step ends. Here, there is a case in which the deposition head 12 injects, for example, different types of powder in a mixed state. In this case, the control device 20 determines the condition of forming the formed layer 92 based on an instruction of injecting different types of powder in a mixed state. Here, the condition of forming the formed layer 92 is a condition necessary to form the formed layer similarly to step S18 of FIG. 11 and includes, for example, a shape of each formed layer, a type of powder, an injection speed of the powder P, an injection pressure of the powder P, an irradiation condition of the laser beam L, a temperature of the molten body A, a cooling temperature of the solid body B, or a movement speed of the base unit 100 using the table unit 11.

When the control device 20 determines that the powder is not appropriate (No in step S73) (No), the control device 20 transmits information telling an inappropriate powder state or inappropriate powder information to an external data server via the communication unit 55 (step S76) and the step ends. In this case, the control device 20 does not generate an instruction of introducing the powder from the powder introduction unit 35 into the deposition head 12 and the step ends. That is, the three-dimensional deposition device 1 stops the supply of the powder to the deposition head 12 when it determines that the powder is not appropriate.

In this way, the control device 20 controls the introduction of the powder from the powder introduction unit 35 to the deposition head 12 in response to the powder identification result of the powder introduction unit 35. When the powder is not appropriate, there is a possibility that the quality of the manufactured three-dimensional object is deteriorated. Further, when the inappropriate powder is irradiated with the laser beam L, the possibility of safety involving with ignition may be decreased. The powder introduction unit 35 introduces the powder into the deposition head 12 only when the powder is appropriate. Thus, the three-dimensional deposition device 1 according to the embodiment can suppress deterioration in quality of the three-dimensional object or deterioration in safety.

Further, when the control device determines that the powder is not appropriate, the control device 20 can transmit information telling an inappropriate powder state or inappropriate powder information to an external data server. Since the external data server stores such information, the powder which is used in the three-dimensional deposition device 1 can be further appropriate. Thus, the three-dimensional deposition device 1 according to the embodiment can improve the quality of the three-dimensional object.

Further, the control device 20 determines the condition of forming the formed layer 92 in response to the powder identification result obtained by the powder introduction unit 35 and controls the operation of the deposition head 12. Thus, the three-dimensional deposition device 1 according to the embodiment can further appropriately form the formed layer 92.

Figure 17:
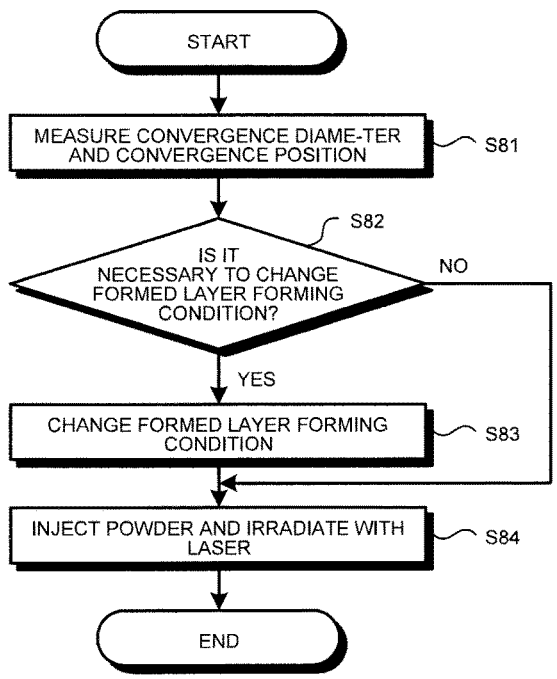
FIG. 17 is a flowchart illustrating an example of a step of changing a formed layer forming condition in the three-dimensional deposition device according to the embodiment.

Further, the three-dimensional deposition device 1 can further include a step of changing the formed layer forming condition by measuring the convergence position and the convergence diameter of the powder P using the machine measurement unit 32. FIG. 17 is a flowchart illustrating an example of the step of changing the formed layer forming condition by the three-dimensional deposition device 1 according to the embodiment. First, the control device 20 measures the convergence diameter and the convergence position of the powder P injected from the deposition head 12 by the machine measurement unit 32 (step S81).

After the control device 20 measures the convergence diameter and the convergence position of the powder P, the control device determines whether to change the formed layer forming condition based on the measurement result of the machine measurement unit 32 (step S82). The control device 20 determines whether to change, for example, the injection condition of the powder P or the irradiation condition of the laser beam L based on the measurement result of the convergence diameter and the convergence position of the powder P. For example, when the convergence diameter and the convergence position of the powder P are not appropriate by a comparison with the three-dimensional object design information, the control device 20 appropriately changes the injection condition of the powder P or the irradiation condition of the laser beam L. For example, when the measured convergence diameter of the powder P is too large compared with the demanded accuracy of forming the formed layer 92, the control device 20 determines that the convergence diameter of the powder P needs to be decreased. Further, for example, when the measured convergence position of the powder P is too near with the base unit 100, the control device 20 determines that the convergence position of the powder P needs to be changed.

When the control device 20 determines that the formed layer forming condition needs to be changed (Yes in step S82), the control device changes the formed layer forming condition (step S83). For example, the control device 20 decreases the convergence diameter of the powder P by increasing the injection speed of the powder. Further, for example, the control device 20 adjusts the convergence position of the powder P by moving, for example, the deposition head 12 in the Z-axis direction.

When the control device 20 determines that the formed layer forming condition is changed or the formed layer forming condition does not need to be changed (No in step S82), the control device forms the formed layer by the movement of the base unit 100 using the table unit 11 while the deposition head 12 injects the powder P and emits the laser beam L (step S84). In this way, the step of changing the formed layer forming condition by the shape measurement unit 30 ends.

Here, in the three-dimensional deposition device 1, the accuracy of the formed layer 92 changes due to the convergence position and the convergence diameter of the injected powder P. For example, in the three-dimensional deposition device 1, when the convergence diameter of the powder P is small, the diameter of the molten body A also decreases and thus the dense formed layer 92 is formed. For example, the three-dimensional deposition device 1 changes the diameter of the molten body A in accordance with the injection position of the powder P and the spot diameter of the laser beam L. As described above, in the three-dimensional deposition device 1, the control device 20 changes and determines the formed layer forming condition in response to the measurement result of the convergence position and the convergence diameter of the powder P using the machine measurement unit 32. The control device 20 then controls the operation of the deposition head 12. Thus, the three-dimensional deposition device 1 can obtain a further appropriate formed layer forming condition and thus manufacture the three-dimensional object with higher accuracy.

Further, in the embodiment, the machine measurement unit 32 measures the position of the front end 56 of the machining unit 13 and both the convergence position and the convergence diameter of the powder P injected from the deposition head 12. That is, the three-dimensional deposition device 1 uses a common device which measures the position of the front end 56 of the machining unit 13 and also measures the convergence position and the convergence diameter of the powder P. Thus, an increase in size of the three-dimensional deposition device 1 can be suppressed. However, the three-dimensional deposition device 1 may separately include a device which measures the position of the front end 56 of the machining unit 13 and a device which measures the convergence position and the convergence diameter of the powder P injected from the deposition head 12.

While the embodiments of the invention have been described, the embodiments are not limited to the content of these embodiments. Further, the above-described components include a component which is easily supposed by the person skilled in the art, a component which has substantially the same configuration, and a component which is in a so-called equivalent scope. The above-described components can be appropriately combined with one another. Additionally, various omissions, substitutions, or modifications of the components can be made without departing from the spirit of the above-described embodiments. For example, the three-dimensional deposition device 1 according to the embodiment is not limited to a configuration in which the deposition head 12 injects the powder P and irradiates the powder P with the laser beam L. The three-dimensional deposition device 1 may be configured to supply the powder P, irradiate the powder P with the laser beam L to form the formed layer, and perform an appropriate machining operation on the formed layer. For example, the three-dimensional deposition device 1 may form the formed layer by forming a powder layer by a powder supply unit and irradiating a part of the powder layer with the laser beam L to sinter the powder. Further, for example, the three-dimensional deposition device may have a configuration in which the control device 20 is connected to an external device via a communication line such as the Internet and a processing condition, for example, a formed layer forming condition is changed and set based on an instruction input from the external device. That is, the three-dimensional deposition device may change the processing condition from the external device by the communication using the communication line.

REFERENCE SIGNS LIST

1 THREE-DIMENSIONAL DEPOSITION DEVICE
2 THREE-DIMENSIONAL DEPOSITION CHAMBER
3 SPARE CHAMBER
4 DEPOSITION HEAD ACCOMMODATION CHAMBER
4a, 5a Z-AXIS SLIDE UNIT
5 MACHINING UNIT ACCOMMODATION CHAMBER
6, 7 DOOR
10 BED
11 TABLE UNIT
12 DEPOSITION HEAD
13 MACHINING UNIT
15 Y-AXIS SLIDE UNIT
16 X-AXIS SLIDE UNIT
17 ROTATION TABLE UNIT
18, 19 BELLOWS
20 CONTROL DEVICE
22 TOOL
23 NOZZLE
24 FRONT END
25 AIR DISCHARGE UNIT
30 SHAPE MEASUREMENT UNIT
31 HEATING HEAD
32 MACHINE MEASUREMENT UNIT
33 TOOL EXCHANGE UNIT
34 NOZZLE EXCHANGE UNIT
35, 35A POWDER INTRODUCTION UNIT
36 BASE MOVEMENT UNIT
37 AIR DISCHARGE UNIT
38 GAS INTRODUCTION UNIT
39 POWDER COLLECTION UNIT
41 OUTER TUBE
42 INNER TUBE
43 POWDER PASSAGE
44 LASER PATH
46 MAIN BODY
47 LIGHT SOURCE
48 OPTICAL FIBER
49 LIGHT CONCENTRATING UNIT
51 INPUT UNIT
52 CONTROLLER
53 STORAGE UNIT
54 OUTPUT UNIT
55 COMMUNICATION UNIT
56 FRONT END
57 LIGHT SOURCE UNIT
58 IMAGE CAPTURING UNIT
61, 71 SHAFT PART
62, 72 DISC PART
63, 73 HOLDING PART
64, 74 BOLT
65, 75 GRIPPING PART
66, 76 MOVEMENT PART
67, 77 OPENING
68, 69, 78, 79 HOLE
81, 81A POWDER STORAGE UNIT
82, 82A POWDER IDENTIFICATION UNIT
83 CARTRIDGE
84 MATERIAL DISPLAY PART
85 INTRODUCTION PART
86 CYCLONE PART
87 GAS DISCHARGE PART
88 POWDER DISCHARGE PART
91 PEDESTAL
92, 93 FORMED LAYER
95 DISC PART
96 HOLE
97 SHAFT PART
98 TRUNCATED CONICAL PART
99 MEMBER
100 BASE UNIT
102, 104, 106, 108 ARROW
A MOLTEN BODY
B SOLID BODY
L LASER BEAM
P POWDER

The invention claimed is:

1. A three-dimensional deposition device which forms a three-dimensional object by depositing a formed layer on a base unit, comprising:
    a deposition chamber;
    a powder supply unit which supplies a powder material into the deposition chamber;
    a light irradiation unit which irradiates the powder material with a light beam and sinters or melts and solidifies at least a part of the powder material irradiated with the light beam to form the formed layer;
    a machining unit which includes a tool and performs a machining operation on the formed layer by the tool;
    a shape measurement unit which measures a surface shape of the formed layer; and
    a controller which controls an operation of at least one of the powder supply unit, the light irradiation unit, and the machining unit, wherein,
    the powder supply unit injects the powder material toward the base unit,
    the light irradiation unit irradiates the powder material feeding from the powder supply unit toward the base unit with a light beam, melts the powder material, and solidifies the melted powder material on the base unit, and
    at least one of the powder supply unit and the machining unit is accommodated in an accommodation chamber, and the deposition chamber and the accommodation chamber are connected by a bellows, and
    wherein, the controller
    controls an operation of at least one of the powder supply unit, the light irradiation unit and the machining unit in response to a measurement result of the surface shape of the formed layer obtained by the shape measurement unit, and
    determines whether the machining operation for the formed layer is needed based on the measurement result of the surface shape, performs the machining operation by the machining unit in accordance with a determination result, and forms the formed layer on a surface of the formed layer subjected to the machining operation by the powder supply unit and the light irradiation unit.

2. The three-dimensional deposition device according to claim 1,
    wherein the powder supply unit includes a nozzle which injects the powder material, and
    the three-dimensional deposition device comprises a nozzle exchange unit which exchanges the nozzle attached to the powder supply unit by attaching and separating the nozzle of the powder supply unit.

3. The three-dimensional deposition device according to claim 1, further comprising:
a machining measurement unit which measures a position of a front end of the tool of the machining unit,
wherein the controller controls an operation of the machining unit in response to the position of the front end of the tool measured by the machining measurement unit.

4. The three-dimensional deposition device according to claim 1, further comprising:
a powder supply measurement unit which measures at least one of a convergence position and a convergence diameter of the injected powder material.

5. The three-dimensional deposition device according to claim 4,
wherein the controller controls an operation of at least one of the powder supply unit and the light irradiation unit in response to at least one of the convergence position and the convergence diameter of the powder material measured by the powder supply measurement unit.

6. The three-dimensional deposition device according to claim 1, further comprising:
a machining measurement unit which measures a position of a front end of the tool of the machining unit; and
a powder supply measurement unit which measures at least one of a convergence position and a convergence diameter of the powder material,
wherein the machining measurement unit and the powder supply measurement unit correspond to a common device.

7. The three-dimensional deposition device according to claim 1, further comprising:
a tool exchange unit which exchanges the tool attached to the machining unit by attaching and separating the tool of the machining unit.

8. The three-dimensional deposition device according to claim 1,
wherein the controller performs a machining operation on a surface of the formed layer by the machining unit after the formed layer is formed by the light irradiation unit and further forms a formed layer on the surface of the formed layer subjected to the machining operation by the light irradiation unit.

9. The three-dimensional deposition device according to claim 1, further comprising:
a powder introduction unit which includes a storage unit storing the powder material supplied to the powder supply unit and an identification unit identifying the powder material stored in the storage unit and introduces the powder material of the storage unit identified by the identification unit into the powder supply unit,
wherein the controller controls an introduction of the powder material from the powder introduction unit to the powder supply unit in response to the powder material identification result in the identification unit.

10. The three-dimensional deposition device according to claim 9,
wherein the controller controls an operation of at least one of the powder supply unit and the light irradiation unit in response to the powder material identification result of the powder introduction unit.

11. The three-dimensional deposition device according to claim 1, further comprising:
a three-dimensional deposition chamber which includes therein the powder supply unit, the light irradiation unit, and the machining unit; and
a base movement unit which moves the base unit from the outside of the three-dimensional deposition chamber into the three-dimensional deposition chamber.

* * * * *